(12) United States Patent
Pawlak et al.

(10) Patent No.: US 11,350,405 B2
(45) Date of Patent: May 31, 2022

(54) ENABLING EXCHANGE OF INFORMATION ON RADIO FRAME CONFIGURATION IN NEIGHBOR CELLS

(71) Applicant: Nokia Solutions and Networks Oy, Espoo (FI)

(72) Inventors: Krystian Pawlak, Wroclaw (PL); Abdurrahman Burak Dayi, Wroclaw (PL); Klaus Pedersen, Aalborg (DK)

(73) Assignee: Nokia Solutions and Networks Oy, Espoo (FI)

( * ) Notice: Subject to any disclaimer, the term of this patent is extended or adjusted under 35 U.S.C. 154(b) by 11 days.

(21) Appl. No.: 16/609,469

(22) PCT Filed: May 4, 2018

(86) PCT No.: PCT/FI2018/050331
§ 371 (c)(1),
(2) Date: Oct. 30, 2019

(87) PCT Pub. No.: WO2018/202956
PCT Pub. Date: Nov. 8, 2018

(65) Prior Publication Data
US 2020/0084766 A1    Mar. 12, 2020

Related U.S. Application Data

(60) Provisional application No. 62/501,993, filed on May 5, 2017.

(51) Int. Cl.
*H04J 3/00* (2006.01)
*H04W 72/04* (2009.01)
(Continued)

(52) U.S. Cl.
CPC ....... *H04W 72/0426* (2013.01); *H04L 5/1469* (2013.01); *H04W 72/0446* (2013.01); *H04W 92/20* (2013.01)

(58) Field of Classification Search
CPC ......... H04W 72/0426; H04W 72/0446; H04W 92/20; H04W 16/10; H04L 5/1469; H04B 7/2656
(Continued)

(56) References Cited

U.S. PATENT DOCUMENTS

2013/0094387 A1* 4/2013 Susitaival ........... H04W 72/082
370/252
2015/0003301 A1    1/2015 He et al. ........................ 370/280
(Continued)

FOREIGN PATENT DOCUMENTS

| EP | 2 699 034 A1 | 2/2014 |
|---|---|---|
| EP | 2 843 987 A1 | 3/2015 |
| WO | WO 2014/110782 | 7/2014 |

*Primary Examiner* — Chuong T Ho
(74) *Attorney, Agent, or Firm* — Harrington & Smith

(57) ABSTRACT

Example embodiments of the invention provide at least a method and apparatus to perform communications between an entity in a cell and a neighboring cell of a cluster of cells of a communication network a request signal indicating a desire to change from a first common radio frame configuration with the neighboring cell to a second different common radio frame configuration; and in response to the request signal, receiving at least one feedback signal from the neighboring cell to perform one of: implementing the change at the cell from the first common radio frame configuration to the second common radio frame configuration when the at least one feedback signal indicates acceptance of the change, and implementing the change at the cell from the first common radio frame configuration to a different individual local radio frame configuration when the at least one feedback signal indicates rejection of the change.

20 Claims, 13 Drawing Sheets

(51) Int. Cl.
*H04L 5/14* (2006.01)
*H04W 92/20* (2009.01)

(58) Field of Classification Search
USPC .......................................... 370/280
See application file for complete search history.

(56) References Cited

U.S. PATENT DOCUMENTS

| | | | |
|---|---|---|---|
| 2015/0043390 A1* | 2/2015 | Wang | H04L 5/1469 |
| | | | 370/280 |
| 2016/0157248 A1* | 6/2016 | Lin | H04W 72/0406 |
| | | | 370/329 |
| 2017/0048912 A1* | 2/2017 | Sharma | H04L 43/0852 |
| 2018/0227766 A1* | 8/2018 | Hong | H04L 5/001 |

* cited by examiner

ENABLING EXCHANGE OF INFORMATION ON RADIO FRAME CONFIGURATION IN NEIGHBOR CELLS

CROSS REFERENCE TO RELATED APPLICATION

This application is a national phase application of International (PCT) Patent Application Number PCT/FI2018/050331 filed May 4, 2018, published under PCT Article 21(2) in English, which claims priority to and the benefit of U.S. application 62/501,993 filed May 5, 2017, the disclosures of which are incorporated herein by reference.

TECHNICAL FIELD

The teachings in accordance with the exemplary embodiments of this invention relate generally to flexible TDD radio frame configuration and, more specifically, relate to decentralized inter-node coordinated TDD radio frame reconfiguration procedures.

BACKGROUND

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

Certain abbreviations that may be found in the description and/or in the Figures are herewith defined as follows:
AAS Active Antenna Systems
CC cell center
CCO Coverage and capacity optimization
CE cell edge
gNB enhanced NodeB
DL Downlink
e-ICIC Enhanced Inter-Cell Interference Coordination)
eIMTA Enhanced Interference Management and Traffic Adaptation
FDD Frequency Division Duplex
GBR Guaranteed Bit Rate
gNB 5G/NR gNB
HO Handover
IE Information Element
KPI Key performance indicator
NB NodeB
NR New Radio for 5G
QoS Quality of Service
RF Radio Frame
RFC Radio Frame Configuration
RLC Radio Link Control
RRC Radio Resource Control
TDD Time Division Duplex
TPM Traffic Priority Metric
UE User equipment
UL Uplink One of the advantages of TDD (over FDD) is the ability to adjust the ratio between uplink and downlink radio resources, such that the available radio resource best match the offered traffic conditions. Several of the early 5G research studies focused on development of dynamic TDD solutions, allowing to quickly switch between uplink and downlink transmission directions per cell. Dynamic TDD is especially considered attractive for indoor small cell scenarios, where cells (access points) are placed in different rooms to serve different sets of users. The latter correspond to scenarios with marginal interference coupling between neighbouring cells.

However, for scenarios with more interference coupling between neighbouring cells, the TDD uplink/downlink configuration needs to be coordinated to a certain extent to avoid cross-link interference that can jeopardize the system performance. This continues to be the case also for the 5G-era; although 5G is expected to include more rich usage of advanced interference suppression and cancellation receivers that are capable of partly mitigating the cross-link interference.

Example embodiments of the invention work to address at least the issues as stated above.

SUMMARY

In an example aspect of the invention, there is a method comprising transmitting by an entity (such as the UE 10 as in FIG. 1A) in a cell to at least one other neighboring cell of a cluster of cells of a communication network a request signal indicating a desire to change from a first common radio frame configuration (RFC) with the at least one other neighboring cell to a second different common radio frame configuration (RFC); and in response to the request signal, receiving at least one feedback signal from the at least one other neighboring cell to perform one of: implementing the change at the cell from the first common radio frame configuration (RFC) to the second common radio frame configuration (RFC) when the at least one feedback signal indicates acceptance of the change, and implementing the change at the cell from the first common radio frame configuration (RFC) to a different individual local radio frame configuration (RFC) when the at least one feedback signal indicates rejection of the change.

A further example embodiment is a method comprising the method of the previous paragraph, wherein the at least one feedback signal comprises an indication of traffic priority and a radio frame configuration for each cell of the cluster of cells, wherein the indication of traffic priority is based on an X2/Xn information element with traffic priority metric, wherein the at least one feedback signal comprises an indication of total GBR and non-GBR radio resource utilization at the cluster of cells for UL and DL traffic, wherein the indication of traffic priority is used to prioritize cells of the cluster of cells based on the total GBR and non-GBR radio resource utilization at the cluster of cells for the UL and DL traffic, wherein the cluster of cells for the request signal is indicated by an Operations, Administration and Maintenance node of the communication network, wherein the change from the first radio frame configuration is performed per subframe in time, where there is receiving acceptance of the change from the first common radio frame configuration from each of the at least one other neighboring cell, wherein the request signal comprises an indication of traffic measurements of the entity, wherein the indication of the traffic measurements of the entity comprises a radio link control buffer status or packet delay, and wherein the request signal is invoking each cell of the at least one other neighboring cell to send their indication of traffic measurements comprising a radio link control buffer status or packet delay of the each cell, where there is receiving signaling comprising the changed radio frame configuration with an aligned time division duplex configuration, where there is sending signaling to each of the at least one other neighboring cell to implement the changed radio frame configuration, wherein the exchanged information comprises preferences for a radio frame configuration based on a traffic capacity of the entity, and wherein the node comprises an Operations, Administration and Maintenance node.

In another example aspect of the invention, there is an apparatus, such as a user side apparatus, comprising: at least one processor; and at least one memory including computer program code, where the at least one memory and the computer program code are configured, with the at least one processor, to cause the apparatus to at least: transmit, from an entity in a cell to at least one other neighboring cell of a cluster of cells of a communication network a request signal indicating a desire to change from a first common radio frame configuration (RFC) with the at least one other neighboring cell to a second different common radio frame configuration (RFC); and in response to the request signal, receive at least one feedback signal from the at least one other neighboring cell to perform one of: implementing the change at the cell from the first common radio frame configuration (RFC) to the second common radio frame configuration (RFC) when the at least one feedback signal indicates acceptance of the change, and implementing the change at the cell from the first common radio frame configuration (RFC) to a different individual local radio frame configuration (RFC) when the at least one feedback signal indicates rejection of the change.

A further example embodiment is an apparatus comprising the apparatus of the previous paragraph, wherein the at least one feedback signal comprises an indication of traffic priority and a radio frame configuration for each cell of the cluster of cells, wherein the indication of traffic priority is based on an X2/Xn information element with traffic priority metric, wherein the at least one feedback signal comprises an indication of total GBR and non-GBR radio resource utilization at the cluster of cells for UL and DL traffic, wherein the indication of traffic priority is used to prioritize cells of the cluster of cells based on the total GBR and non-GBR radio resource utilization at the cluster of cells for the UL and DL traffic, wherein the cluster of cells for the request signal is indicated by an Operations, Administration and Maintenance node of the communication network, wherein the change from the first radio frame configuration is performed per subframe in time, where the at least one memory including the computer program code is configured with the at least one processor to cause the apparatus to receive acceptance of the change from the first common radio frame configuration from each of the at least one other neighboring cell, wherein the request signal comprises an indication of traffic measurements of the entity, wherein the indication of the traffic measurements of the entity comprises a radio link control buffer status or packet delay, and wherein the request signal is invoking each cell of the at least one other neighboring cell to send their indication of traffic measurements comprising a radio link control buffer status or packet delay of the each cell, where the at least one memory including the computer program code is configured with the at least one processor to cause the apparatus to receive signaling comprising the changed radio frame configuration with an aligned time division duplex configuration, where the at least one memory including the computer program code is configured with the at least one processor to cause the apparatus to send signaling to each of the at least one other neighboring cell to implement the changed radio frame configuration, wherein the exchanged information comprises preferences for a radio frame configuration based on a traffic capacity of the entity, and wherein the node comprises an Operations, Administration and Maintenance node.

In another exemplary embodiment, an apparatus comprises means for transmitting from an entity (such as the UE 10 as in FIG. 1A) in a cell to at least one other neighboring cell of a cluster of cells of a communication network a request signal indicating a desire to change from a first common radio frame configuration (RFC) with the at least one other neighboring cell to a second different common radio frame configuration (RFC); and in response to the request signal, receiving at least one feedback signal from the at least one other neighboring cell to perform one of: implementing the change at the cell from the first common radio frame configuration (RFC) to the second common radio frame configuration (RFC) when the at least one feedback signal indicates acceptance of the change, and implementing the change at the cell from the first common radio frame configuration (RFC) to a different individual local radio frame configuration (RFC) when the at least one feedback signal indicates rejection of the change.

A further exemplary embodiment is an apparatus comprising the apparatus of the previous paragraph, wherein the at least one feedback signal comprises an indication of traffic priority and a radio frame configuration for each cell of the cluster of cells, wherein the indication of traffic priority is based on an X2/Xn information element with traffic priority metric, wherein the at least one feedback signal comprises an indication of total GBR and non-GBR radio resource utilization at the cluster of cells for UL and DL traffic, wherein the indication of traffic priority is used to prioritize cells of the cluster of cells based on the total GBR and non-GBR radio resource utilization at the cluster of cells for the UL and DL traffic, wherein the cluster of cells for the request signal is indicated by an Operations, Administration and Maintenance node of the communication network, wherein the change from the first radio frame configuration is performed per subframe in time, where there is receiving acceptance of the change from the first common radio frame configuration from each of the at least one other neighboring cell, wherein the request signal comprises an indication of traffic measurements of the entity, wherein the indication of the traffic measurements of the entity comprises a radio link control buffer status or packet delay, and wherein the request signal is invoking each cell of the at least one other neighboring cell to send their indication of traffic measurements comprising a radio link control buffer status or packet delay of the each cell, where there is receiving signaling comprising the changed radio frame configuration with an aligned time division duplex configuration, where there is sending signaling to each of the at least one other neighboring cell to implement the changed radio frame configuration, wherein the exchanged information comprises preferences for a radio frame configuration based on a traffic capacity of the entity, and wherein the node comprises an Operations, Administration and Maintenance node.

In an example aspect of the invention, there is a method comprising: receiving (by a device such as an eNB or gNB such as the base station 12 as in FIG. 1A) from an entity (such as the UE 10 as in FIG. 1A) in a first cell by a neighboring second cell of a cluster of cells a request signal indicating a desire of the first cell to change from a first common radio frame configuration (RFC) with the neighboring second cell to a second different common radio frame configuration (RFC); and in response to the request signal, transmitting by the neighboring second cell to the first cell a feedback signal to perform one of: acceptance of the change, signaling for the first cell to thereby implement the change from the first common radio frame configuration (RFC) to the second common radio frame configuration (RFC), or alternatively rejection of the change, signaling for the first cell to thereby implement a change at the first cell from the first common radio frame configuration (RFC) to a different individual local radio frame configuration (RFC).

A further exemplary embodiment is a method comprising the method of the previous paragraph, wherein the request signal comprises an indication of traffic priority and a radio frame configuration for the entity in the first cell, wherein the indication of traffic priority is based on an X2/Xn information element with traffic priority metric, wherein the at least one feedback signal comprises an indication of total GBR and non-GBR radio resource utilization at the entity for UL and DL traffic, wherein the indication of traffic priority is used to prioritize cells of the cluster of cells based on the total GBR and non-GBR radio resource utilization at the cluster of cells for the UL and DL traffic, wherein the change from the first radio frame configuration is performed per subframe in time, where there is sending acceptance of the change for the first cell, where there is sending signaling comprising the changed radio frame configuration with an aligned time division duplex configuration to the neighboring second cell, wherein the request signal comprises an indication of traffic measurements of the entity, wherein the indication of the traffic measurements of the entity comprises a radio link control buffer status or packet delay, and wherein the request signal is invoking each cell of the at least one other neighboring cell to send their indication of traffic measurements comprising a radio link control buffer status or packet delay of the each cell, and wherein the entity comprises an Operations, Administration and Maintenance node.

In another example aspect of the invention, there is an apparatus, such as a network side apparatus (e.g., an eNB or a gNB such as the base station 12 as in FIG. 1A), comprising: at least one processor; and at least one memory including computer program code, where the at least one memory and the computer program code are configured, with the at least one processor, to cause the apparatus to at least: receive from an entity in a first cell by a neighboring second cell of a cluster of cells a request signal indicating a desire of the first cell to change from a first common radio frame configuration (RFC) with the neighboring second cell to a second different common radio frame configuration (RFC); and in response to the request signal, transmit from the neighboring second cell to the first cell a feedback signal to perform one of: acceptance of the change, signaling for the first cell to thereby implement the change from the first common radio frame configuration (RFC) to the second common radio frame configuration (RFC), or alternatively rejection of the change, signaling for the first cell to thereby implement a change at the first cell from the first common radio frame configuration (RFC) to a different individual local radio frame configuration (RFC).

A further exemplary embodiment is an apparatus comprising the apparatus of the previous paragraph, wherein the request signal comprises an indication of traffic priority and a radio frame configuration for the entity in the first cell, wherein the indication of traffic priority is based on an X2/Xn information element with traffic priority metric, wherein the at least one feedback signal comprises an indication of total GBR and non-GBR radio resource utilization at the entity for UL and DL traffic, wherein the indication of traffic priority is used to prioritize cells of the cluster of cells based on the total GBR and non-GBR radio resource utilization at the cluster of cells for the UL and DL traffic, wherein the change from the first radio frame configuration is performed per subframe in time, where the at least one memory including the computer program code is configured with the at least one processor to cause the apparatus to send acceptance of the change for the first cell, where the at least one memory including the computer program code is configured with the at least one processor to cause the apparatus to send signaling comprising the changed radio frame configuration with an aligned time division duplex configuration to the neighboring second cell, wherein the request signal comprises an indication of traffic measurements of the entity, wherein the indication of the traffic measurements of the entity comprises a radio link control buffer status or packet delay, and wherein the request signal is invoking each cell of the at least one other neighboring cell to send their indication of traffic measurements comprising a radio link control buffer status or packet delay of the each cell, and wherein the entity comprises an Operations, Administration and Maintenance node.

In another example aspect of the invention, there is an apparatus comprising: means for receiving (by a device such as an eNB or a gNB such as the base station 12 as in FIG. 1A) from an entity (such as the UE 10 as in FIG. 1A) in a first cell by a neighboring second cell of a cluster of cells a request signal indicating a desire of the first cell to change from a first common radio frame configuration (RFC) with the neighboring second cell to a second different common radio frame configuration (RFC); and means, in response to the request signal, for transmitting by the neighboring second cell to the first cell a feedback signal to perform one of: acceptance of the change, signaling for the first cell to thereby implement the change from the first common radio frame configuration (RFC) to the second common radio frame configuration (RFC), or alternatively rejection of the change, signaling for the first cell to thereby implement a change at the first cell from the first common radio frame configuration (RFC) to a different individual local radio frame configuration (RFC).

A further exemplary embodiment is an apparatus comprising the apparatus of the previous paragraph, wherein the request signal comprises an indication of traffic priority and a radio frame configuration for the entity in the first cell, wherein the indication of traffic priority is based on an X2/Xn information element with traffic priority metric, wherein the at least one feedback signal comprises an indication of total GBR and non-GBR radio resource utilization at the entity for UL and DL traffic, wherein the indication of traffic priority is used to prioritize cells of the cluster of cells based on the total GBR and non-GBR radio resource utilization at the cluster of cells for the UL and DL traffic, wherein the change from the first radio frame configuration is performed per subframe in time, where there is means for sending acceptance of the change for the first cell, where there is means for sending signaling comprising the changed radio frame configuration with an aligned time division duplex configuration to the neighboring second cell, wherein the request signal comprises an indication of traffic measurements of the entity, wherein the indication of the traffic measurements of the entity comprises a radio link control buffer status or packet delay, and wherein the request signal is invoking each cell of the at least one other neighboring cell to send their indication of traffic measurements comprising a radio link control buffer status or packet delay of the each cell, and wherein the entity comprises an Operations, Administration and Maintenance node.

BRIEF DESCRIPTION OF THE DRAWINGS

The foregoing and other aspects of embodiments of this invention are made more evident in the following Detailed Description, when read in conjunction with the attached drawing figures, wherein.

DETAILED DESCRIPTION

Figure 1:
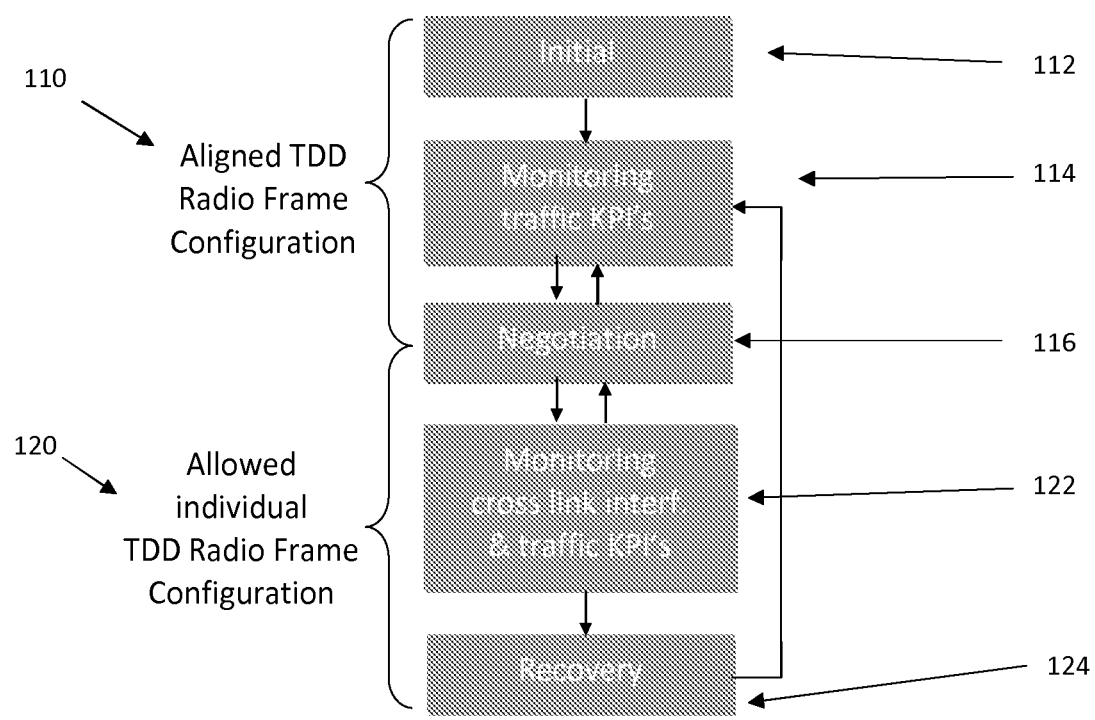
FIG. 1 shows a process for radio frame configuration.

In this invention, we propose a sequence design that will at least enable decentralized inter-node coordinated TDD radio frame reconfiguration procedures.

As an example, for a macro cellular setting, the gNB transmit power is typically on the order of ~49 dBm, having antenna gain of at least ~14 dBi and, thus, resulting in an equivalent isotropic radio power (EIRP) of ~63 dBm. The EIRP for the UE is typically only 23 dBm, assuming a maximum transmit power of 23 dBm and 0 dBi antenna gain. The large output power imbalance (~40 dB in EIRP and ~26 dB without antenna gains) between UE's and gNB's for a macro scenario sets additional restrictions on the TDD operation, since closely coupled cells will have to coordinate the use and timing of uplink/downlink transmissions to avoid severe cross-link interference problems. This essentially calls for some degree of multi-cell coordinated TDD operation. Thus, each cell does not have the full freedom to determine if the cell resources are used for uplink or downlink, as some alignment and coordination with other cells in the vicinity is required. The use of massive MIMO and advanced interference suppression techniques can, however, help relax the requirements for tight inter-cell coordination.

Finding the optimal selection of TDD radio frame configuration per cell is a highly complex and non-trivial problem. It depends on the current offered traffic to the system, which in it nature is a time-variant process. It depends on the interference coupling between the cells; isolated cells should be allowed to operate fully independent with fast autonomous switching between uplink and downlink transmission directions, while cells with higher interference coupling needs to cooperate. Features as described herein address the design of fully distributed and autonomous inter-cell coordination framework for adjustment of the used TDD uplink/downlink configuration for cells, resulting in the best possible system performance. This may provide a general framework that builds on distributed backhaul coordination procedures. The solution may be fully self-adjustable, generic to physical layer terminology and applicable to any scenario (small cells, macro-cells, etc.). Furthermore, this may provide a QoS-aware solution that not only takes the offered traffic for the two link-directions into account, but also the QoS for the active sessions into account when adjusting the used TDD uplink/downlink configuration. Finally, features may be used to cope with cases where gNBs are sometimes switched on/off, where new gNBs are installed, and older ones may be taken out of service.

The radio frame structure for 5G is defined by 3GPP for the New Radio (NR). The radio frame structure will consist of a number of subframes. Subframes contain slots, and may also contain so-called mini-slots. Each slot can be downlink only, uplink only, or bi-directional with downlink transmission followed by uplink transmission within the same slot. By default, a subframe is 1 ms, while slots equal 7 symbols, and mini-slots are 1-3 symbols. The exact time-duration of a slot (and mini-slot) therefore depends on the physical layer numerology. For the base physical layer numerology with 15 kHz sub carrier spacing, a slot equals 0.5 ms, i.e. two slots per 1 ms subframe. A 10 ms radio frame of ten 1 ms subframes, always include both DL and UL transmission opportunities for TDD cases.

The 3GPP specification has been defined for LTE TDD e-IMTA from Rel.13. eNodeBs select subframes, that can be set flexibly and exchange messages between each other, including two additional X2 interface Information Elements:

"Intended UL-DL Configuration"—it indicates the UL-DL configuration intended to be used by the indicated cell. The receiving gNB may take such information into account when setting its scheduling policy and shall consider the received Intended UL-DL Configuration IE value valid until reception of a new LOAD INFORMATION message carrying an update of the same IE.

"Extended UL Interference Overload Info" it indicates the interference level experienced by the indicated cell on all resource blocks, per PRB, in the UL subframe(s) which is represented as value "1" in the Associated Subframes IE.

Finally, the 3GPP specification offer tools to monitor interference, and possibly report problems (e.g. High Interference Indicator and Relative Narrowband TX Power, RNTP). The above solution is re-active and can be used to report problems are already disturbing radio performance and the usage would require a trial-and-error approach. It also provides high uncertainty about RFC's actually used in the network. This might be critical for delay intolerant traffic.

Features as described herein may be used in regard to to 5G New Radio and, in particular, 5G MAX project targeted for 3GPP Rel-15 and beyond. Features may be used for design of fully distributed and autonomous inter-cell coordination framework for adjustment of the used TDD uplink/downlink configuration for cells. An event of a cell being forced to apply a common TDD configuration, due to the high interference, may be noted and reflected during negotiation phase that will take place in future. This may avoid multiple negotiations in very bad interference conditions. It may be used as additional element to reject individual TDD adjustments in the future for particular pair of cells (can be also used as an element for initial conditions before negotiations).

FIG. 1 shows an example of the process which may be applied per cell or eNodeB, also referred to as gNB in 3GPP NR. New coordination procedure with steps as shown in the example of FIG. 1 include: initialisation, monitoring, negotiation, recovery. These operations are described in detail below.

Features as described herein may be used in the technical field of mobile radio communications with focus on flexible TDD radio frame configuration (RFC) and changes enabled by information exchange between network nodes (e.g. over Xn like interface). The RFC expresses a sequence of uni-directional or bi-directional slots and subframes used by a cell, without imposing or precluding any radio frame length. The RFC may be configured in a number of ways, where some of the options are:

In the stand alone way the RFC is selected independently by each cell (or gNB) without any prior coordination.

In the decentralised coordinated approach, the RFC decisions is a result of information exchange and agreement among the cells (or gNBs) belonging to the same local cluster. The RFC of the cells is coordinated via message exchange between the nodes.

In the centralized approach the RFC decision is a result of a central decision making entity having information from all gNBs in the cluster. In contrast to decentralised approach, gNBs send information (traffic and load statistics or optionally measurements) directly to central entity and in exchange receive the exact RFC configuration to use. The central entity can be located e.g. in one of the gNBs in the cluster or can be virtualized in cloud.

One of the features of the present disclosure is in regard to decentralized inter-node coordinated TDD radio frame reconfiguration procedures. Features may provide a design of fully distributed and autonomous inter-cell coordination framework for adjustment of the used TDD uplink/downlink configuration for cells, resulting in the best possible system performance. An example of the proposed process for Radio Frame Configuration (RFC) is depicted in the FIG. 1. This process is applied per cell or base station, also referred as gNB in 3GPP NR terminology. A base station provides the equipment (such as antenna, transmitter, receiver, controller, memory, etc. for example) which is adapted to operate one or more cells according to the functionality described herein. Therefore, the term "cell" is used frequently herein, but the base station with its equipment provide the functionality of the cell.

Regarding FIG. 1, the aligned TDD radio frame configuration 110 includes the initial phase 112, monitoring traffic KPI's 114, and negotiation 116. The initial phase 112 may be characterized by the following behaviour:

A new cell (or gNB) that is switched on first starts exchanging information with its neighbouring cells (or gNBs) in the same local cluster. During this phase, information of the traffic priority per cell (of gNB) and currently used individual RFC is exchanged. The new cell may aim at using a RFC that has the most commonalities with its neighboring cells (gNBs). The examples of used Traffic Priority Metric (TPM) is described below.

A cluster of cells (or gNBs) that are (re-)activated with heavy traffic may exchange the information about traffic priority (X2/Xn Information Element with Traffic Priority Metric) for each cell within the cluster. The result is that new common RFC may be setup by algorithm for each cell.

After having completed the initial phase, the cell (or gNB) may enter the monitoring phase 114 before changing its RFC:

Per description of the initial phase above, the cell (or gNB) may enter this monitoring phase with a common RFC that is aligned (synchronous and identical) to its neighbour(s). The cell (or gNB) may start to monitor its experienced traffic load for the two link directions (uplink and downlink), with the objective of detecting if there is a need to adjust the common RFC, such as to have more downlink or uplink transmission resources for example. Monitoring of the experienced offered traffic may be via throughput measurements, buffer data in the gNB pending for downlink transmissions, buffer status reports from the cells (or gNB) UEs (such as uplink load for example), and may include QoS requirements, UL/DL spectral efficiency, as well as detection of congestions and potential admission control rejections due to insufficient capacity. If there is a need to change RFC to better balance between UL/DL traffic, the cell (or gNB) may enter the negotiation phase.

The following may take place in the negotiation phase 116:

The cell (or gNB) that have detected a need for changing its RFC to better serve its offered traffic, reports the desire to change common RFC together with neighbouring cells (or gNBs). The requesting cell will await feedback from its neighbouring cells (or gNBs) before selecting and implementing the new common RFC change in the whole cluster. If proposed change was rejected the requesting cell will continue negotiation to enable individual/local RFC adjustment for particular cell(s).

To make this happen, neighbour cells (or gNBs) may need to accept individual configuration change applied at requesting cell (or gNB). To make these decisions more efficient, cells (or gNBs) may collaborate and their decision may be based on 1) rough estimates of risk for high cross link interference (such as, for example, based on gNB-to-gNB path loss or number of cell edge users) and 2) experienced traffic load. (The implementation of the scheme will give enough flexibility to modify risk on the cross UL/DL interference from low to high).

As the initial estimates of interference might be incorrect and result in poor performance for non-aligned TDD subframes, the algorithm may allow to negotiate only for one slot or subframe in a radio frame in a time.

Cells may return to negotiations anytime it is needed. Negotiation may also include the requests from/to neighbour cells to, such as for example, limit scheduling of cell edge UE's (in both UL and DL) for non-aligned slots or subframes to minimise risk of severe cross link interference.

The allowed individual TDD radio frame configuration 120 includes monitoring cross-link interference and traffic KPI's 122 phase and Recovery procedure 124.

When there is at least one cell with an individual RFC in the neighbourhood, all cells may enter a Monitoring cross-link interference and traffic KPI's phase:

In this Monitoring cross-link interference and traffic KPI's 122 phase, the network may operate with partially not aligned RFCs (with different UL/DL TDD switching points), but still fully controlled by the network. An overall benefit from individual RFCs lies in detection of network performance decrease due to the cross-link interference.

The cross-link interference may be monitored by all exposed cells (involved in the negotiation process). Cells may monitor UE measurements, for example, well defined Reference Signal Received Quality (RSRQ) and own measurements like Received Interference Power. Each nonaligned slot or subframe may be monitored separately as they might be set in different interference conditions due to the varying limitations for cell edge users (from slot to slot, or subframe to subframe) and corresponding interference.

If the previously requesting cell has further need to change individual RFC, then the cell may return to the negotiation phase. Other gNBs may use measured levels of cross-link interference as an underlying argument to prevent requesting cell from further adjustments. If traffic needs change again, the requesting cell may also go back to the negotiation phase to decrease the number of non-aligned cell(s) or even move back to use a common RFC.

Given that there are sufficient resources available at the cells (or gNBs) to flexibly schedule owned UEs including cell-edge users, cells may return to negotiations to set more restricted conditions on the scheduling of the next transmission (such as, for example, less cell edge users scheduled in particular slot or subframe). This may decrease cross link interference if higher cross interference is measured by one of the cells being involved in the negotiation.

If there is not sufficient resources at gNBs for flexible scheduling of owned users and higher cross interference is measured by one of the cells having involved in the negotiation, traffic KPI of the cell using a Common RFC may decline in the way that:
  KPI's are still better than required QoS values by certain level, then cells can go back to negotiations for non-aligned subframes. For example, it might request to use RFC with less non-aligned slots or subframes.
  KPI's are worse than required QoS values, then gNB may force a cell on a non-aligned pattern to adopt again a common RFC by triggering the recovery procedure.

In the Recovery procedure 124, the cell (or gNB) that previously approved neighbour cell request to use individual RFC, may request from a neighbour cell causing cross-link interference (in UL or DL) to stop using the individual RFC and return to the latest known common TDD RFC. Each cell that has received the request may have to apply the change immediately. The recovering cell may inform about changing the TDD configuration to neighbour cells. If some of the neighbour cells were also using non-aligned TDD radio frame configurations, they may also need to renegotiate this with the recovering cell.

The event that cell was forced to apply common TDD configuration due to the high interference may be noted and reflected during the negotiation phase that will take place in future. The purpose of this would be to avoid multiple negotiations in bad interference conditions. It may be used as an additional argument to reject individual TDD adjustments in the future for a specific pair of cells (and may be also used as an argument for initial conditions before negotiations). More detailed description of procedures and related Xn message flows is provided below.

Features as described herein may be used to provide the required signalling procedures dealing with various problems caused by the local variation of the UL/DL traffic ratios. A set of procedures may be provided that allows TDD radio frame configuration adaptation to instantaneous needs. In many cases cross-link interference will appear, but due to the negotiations, monitoring and recovery procedures their impact on the network performance will be limited. Features as described herein allows to include local traffic characteristics in the wide scale of entire cluster. This also allows for local adjustments where only few cells are involved. Traffic characteristics used to adjust the TDD are not only limited to the traffic load but, for example, may also include other traffic KPI's, based on for instance QoS requirements.

For comparison with prior art solutions, such as LTE e-IMTA, cells are indicating the need to allocate subframes flexibly accordingly to the own traffic by informing neighbour cells about their intentions regarding used TDD configuration. Cells are not collaborating to optimise network performance or improve fairness between cells for high QoS. Their only way to react on the cross interference is to report UL interference overload IE over Xn interface. Additionally, in the e-IMTA the flexibility of the scheme depends highly on the default LTE TDD configuration where only UL subframes can be used in flexible way. Features as described herein do not have any restrictions such as this.

In the following, the TDD RFC adjustment phases are described in more details, including Xn message flows and corresponding Information Elements included in Load Information message. The following may be used as descriptions for better understanding in the following sections:
  Common Radio Frame Configuration—A radio frame has a duration of 10 ms, consisting of subframes with 1 ms duration. Each subframe consists of a series of slots. A slot can be configured to be for downlink transmission only, uplink transmission only, or bi-directional with downlink transmission followed by uplink transmission. The time-duration of a slot depends on the physical numerology. With the base 5G new radio numerology (with 15 kHz sub carrier spacing), a slot equals 0.5 ms. for sub-carrier spacing 30 kHz, the slot duration equals 0.25 ms, and so forth. So the number of slots per subframe varies depending on the physical layer numerology (sub carrier spacing and symbol times). For the considered TDD case, a radio frame always contain both DL and UL transmission opportunities. Each cell has only one Radio Frame Configuration in a time, but if all cells in the cluster of cells agree to use the same RFC with aligned UL/DL directions for each slot and subframe, this may be called the Common Radio Frame Configuration. The Common RFC Information Element for Xn interface is caring either information to indicate preferred change in common RFC or information that is actually modifying Common RFC in cluster of cells. The preferred Common RFC selection may be done based on UL/DL traffic proportions, or may include UL & DL spectral efficiency, user specific link quality or metrics related with user's experience.
  Individual Radio Frame Configuration—This term refers to the non-aligned radio frame configuration belonging to a particular gNB, which deviates from the common RFC as a result of successful negotiations. Each cell may negotiate with neighbour cells to deviate from Common RFC and apply Individual RFC. Every adjustment must be individually confirmed by neighbour cells. Xn Information Element include requested RF configuration and also information about limitation for cell edge users scheduling indicated for each slot and subframe. It is possible that in one cluster of cells some cells will be using common RFC while other cells will be using individual RFC.

Cell edge users/UEs—This term describes the users that report similar received power measurements from more than one gNBs with difference no more than a pre-defined threshold. The threshold is not absolutely specified here but, for instance, it could be similar to those used in well-known handover reporting procedures.

Cell center users/UEs—This term describes the users that can indicate one gNB, from which they receive the most signal power than from other gNBs beyond a pre-defined threshold.

Cluster of cells—cells that where indicated by OAM (Operation and Maintenance) on Automatic Neighbour Relation Function in RNC to collaborate on RFC setup via Xn/X2 interface.

Neighbour cells—could be a subset of cells in the cluster, can even including neighbour cells across clusters. The pathloss or inter-cell interference may be a key criteria.

Traffic Priority Metric (TPM)—An information element of Xn/X2 messaging and can be described as:
  Similar to X2 "Radio Resource Status" Information Element where radio resource utilization is indicated for total/GBR/non-GBR traffic in UL and DL.
  Similar to above IE, but indicates the buffer status for each traffic type and direction.
  Also, traffic statistics with QoS KPI's such as, for example, packets delayed beyond the target, etc.

Adding New/Re-Activated Cell to the Cluster

There at least two approaches to handle new cell or individual reactivated cell (or gNB), after they become a member of the collaborative cluster such as, for example, have been added to the neighbourhood list in OAM.

In the first approach new cell (gNB1) receives from OAM exact configuration of Common RFC with aligned TDD configuration. As impact of the cross-link interference is unknown the Common RFC need to be set also in all neighbour cells. All Individual RFC agreements are erased.

Figure 2:
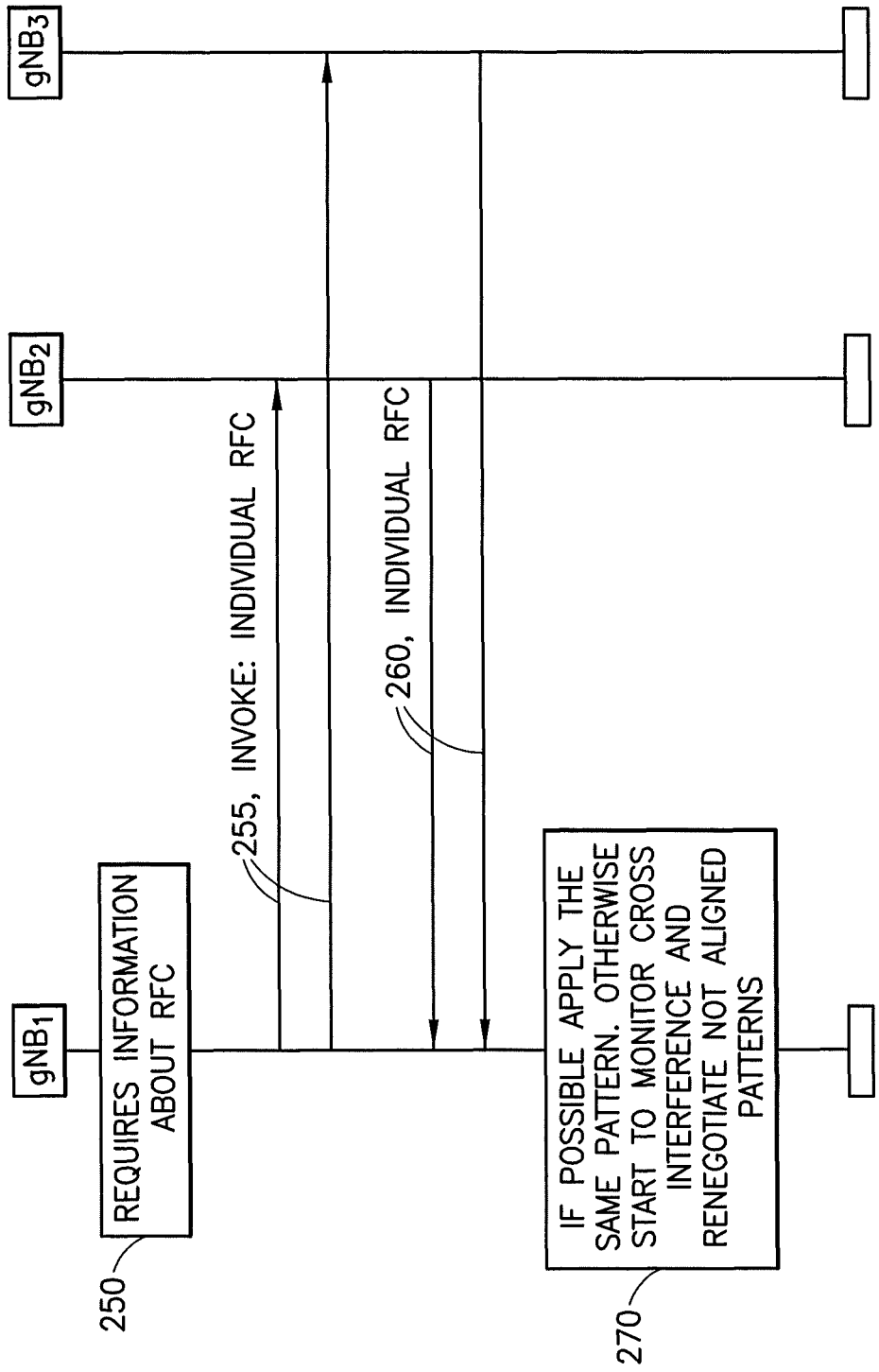
FIG. 2 shows an Xn/X2 message flow chart for adding a new cell to the collaboration.

Second approach (FIG. 2) is providing much less distortion to the network and lead to the faster configuration alignment in complex traffic and interference scenarios. FIG. 2 shows an Xn/X2 message flow chart for adding a new cell to the collaboration. As shown in step 250 of FIG. 2 the gNB1 requires information about individual RFC. The gNB1 sends an invoke message 255 for "Individual RFC" to the closest neighbours. In this case the neighbour(s) include $gNB_2$ and $gNB_3$. In response, $gNB_1$ can receive different TDD radio frame configurations 260 including limitation for cell edge users. Cell may align to the received information and if necessary renegotiate individual conditions. In addition, as shown in block 270 of FIG. 2, if possible $gNB_1$ can apply the same pattern otherwise starts to monitor cross interference and renegotiate not aligned patterns.

Initial Set of Radio Frames Configuration in the Cluster

This procedure can be started when single cell is joining the cluster or it is the first setup of Common RFC in the cluster of cells.

OAM entity triggers all cells inside cluster to start reporting to each other the information required to set up the common RFC. We assume that, after information exchange, all cells will have the same data available for the algorithm that run locally at each base station, and its calculation will indicate the same RFC.

The exchanged information may include:
  gNB preferences for Radio Frame Configuration that depends on own traffic consideration and estimation of own capacity in UL and DL.
  Traffic Priority Metric (TPM) that will allow to up prioritize cells that will more urgently require more UL or DL resources.

Figure 3:
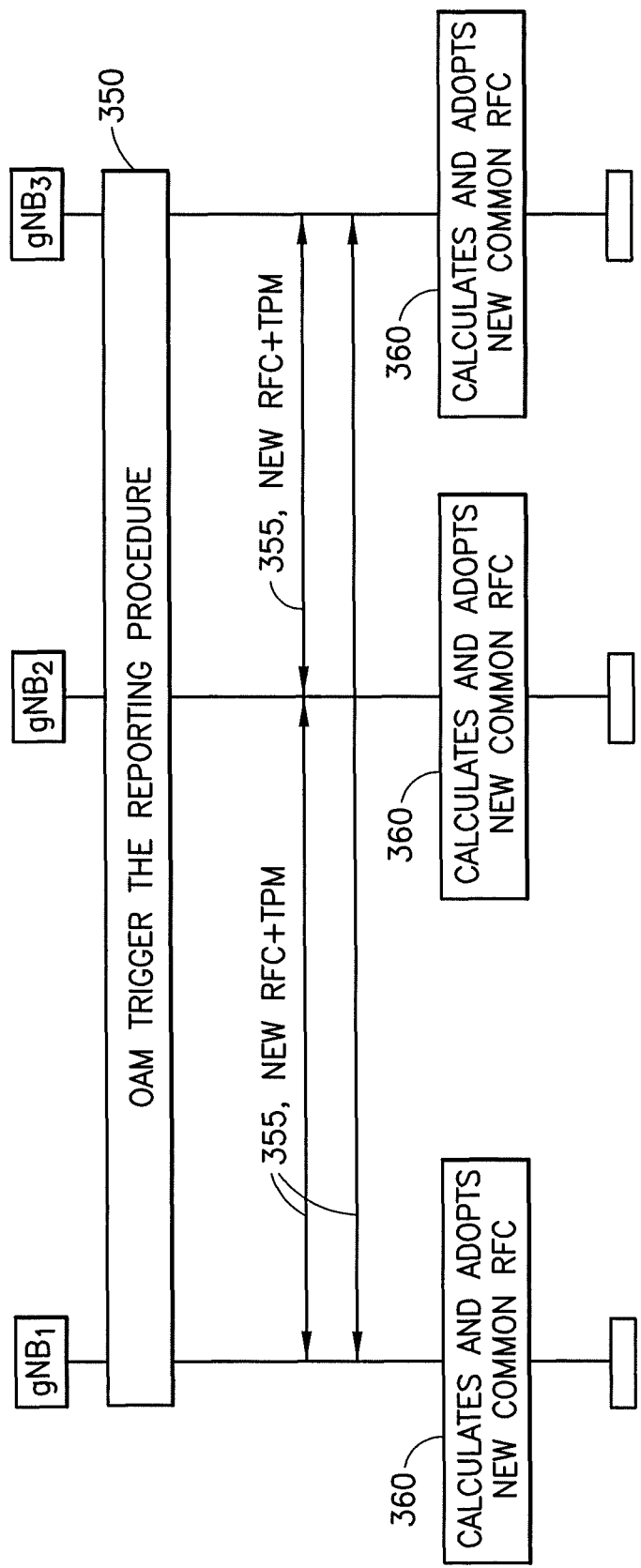
FIG. 3 shows an Xn/X2 message flow chart for initial common RFC setup procedure for collaboration cluster.

An aim of the algorithm may be to select the optimal RFC for a group of cells. It can be parametrized to prioritize such as, for example, maximization of network performance or average user experience. The OAM entity (e.g., $gNB_1$) may be responsible for parameters provided to the algorithm. An example message diagram for initial procedure is presented on FIG. 3. As shown in FIG. 3 the OAM trigger the reporting procedure 350 is triggered by OAM, New RFC+TPM are communicated to OAM entity and neighbor cells $gNB_2$ and $gNB_3$, at 355, then as shown in step 360 of FIG. 3, each of the $gNB_1$, $gNB_2$ and $gNB_3$ each calculates and adopts new Common RFC.

1) The OAM trigger procedure is triggered by OAM for all gNBs in the cluster (or close neighborhood if there is no clustering setup).
2) Preferred RFC's and TPM IE are cross signaled inside the cluster.
3) As all gNB's received exactly the same data, the RF selection algorithm can be performed with the same result to all gNBs.

Figure 7:
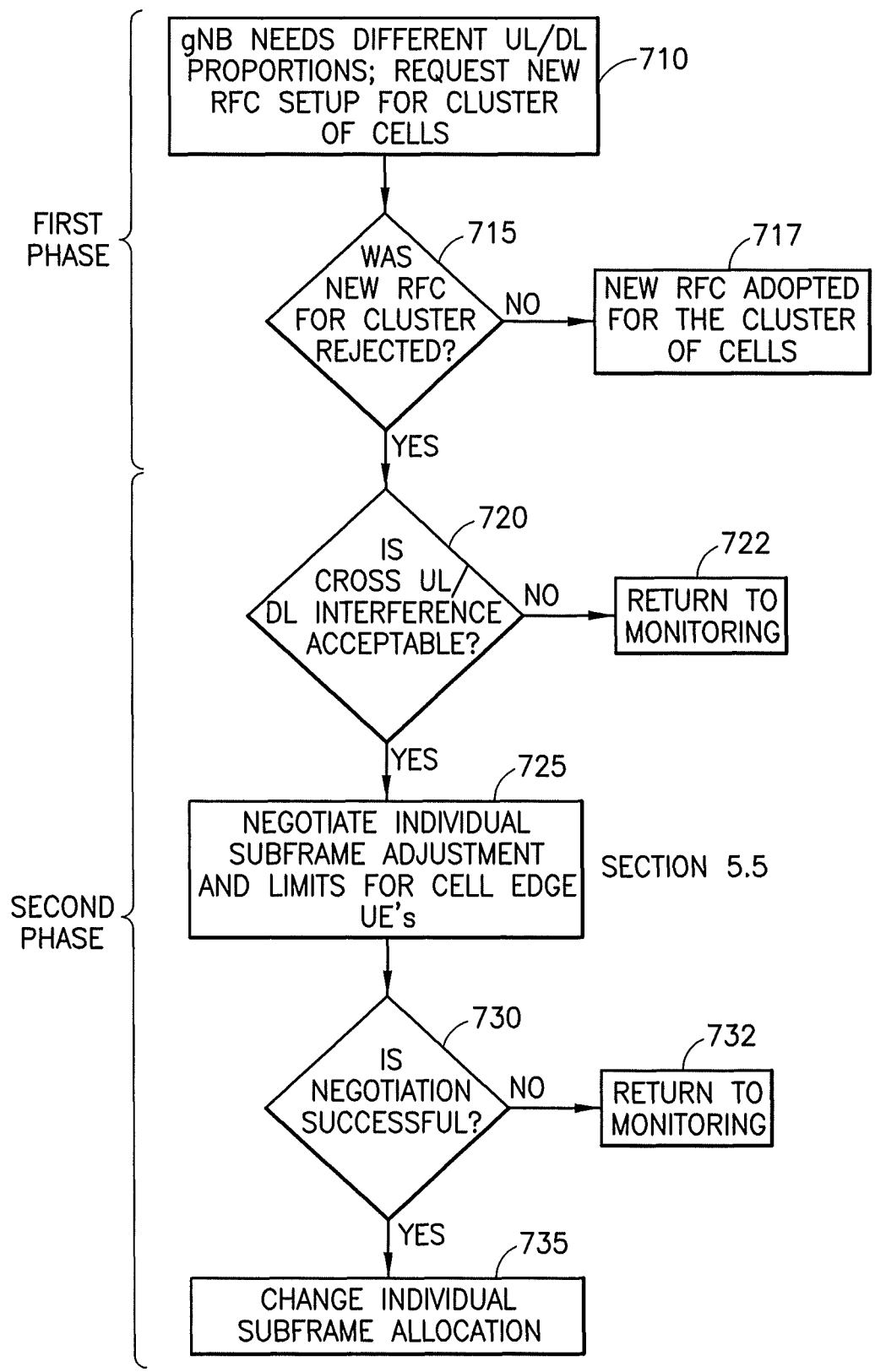
FIG. 7 shows a negotiation process for common and individual TDD configurations.

FIG. 7 shows a negotiation process for common and individual TDD configurations. As shown in step 710 of FIG. 7 the gNB needs different UL/DL proportions; request new RFC setup for clusters of cells. As shown in step 715 of FIG. 7 it is determined was new RFC for cluster rejected? If No, then to step 717 where new RFC adopted for the cluster of cells, if yes then step 720. As shown in step 720 of FIG. 7 it is determined is cross UL/DL interference acceptable? If No, then to step 722 return to monitoring, else to step 725. As shown in step 725 of FIG. 7 there is negotiating individual subframe adjustment and limits for cell edge UEs. Then at step 730 of FIG. 7 it is determined is the negotiation successful? If no, then to step 732 return to monitoring, else to step 735. As shown in step 735 there is changing individual subframe allocations.

Common Radio Frame Reconfiguration—Option 1 (corresponding to Phase I in FIG. 7)

After the Radio Frame is set up for entire cluster there might still be a need to modify Common RFC due to the rapid changes in traffic proportions on cluster level.

The reconfiguration may be done in the similar way as in case of initial setup. However, each time it may have N*(N−1)(N=number of gNBs) messages to be exchange over Xn interface. OAM or some central entity may need to be involved to distribute the request.

The features described below requires significantly fewer messages. The gNB, after deciding to make the change request, may initiate the decision process and temporarily administer it, while the rest of nodes may follow the decision. Input from many cell may be included in the decision process. In case that more than one gNBs would request change at the same time, then cells may automatically select a requesting cell with higher priority to have the process initiated (such as based on absolute KPI's for example).

Figure 4:
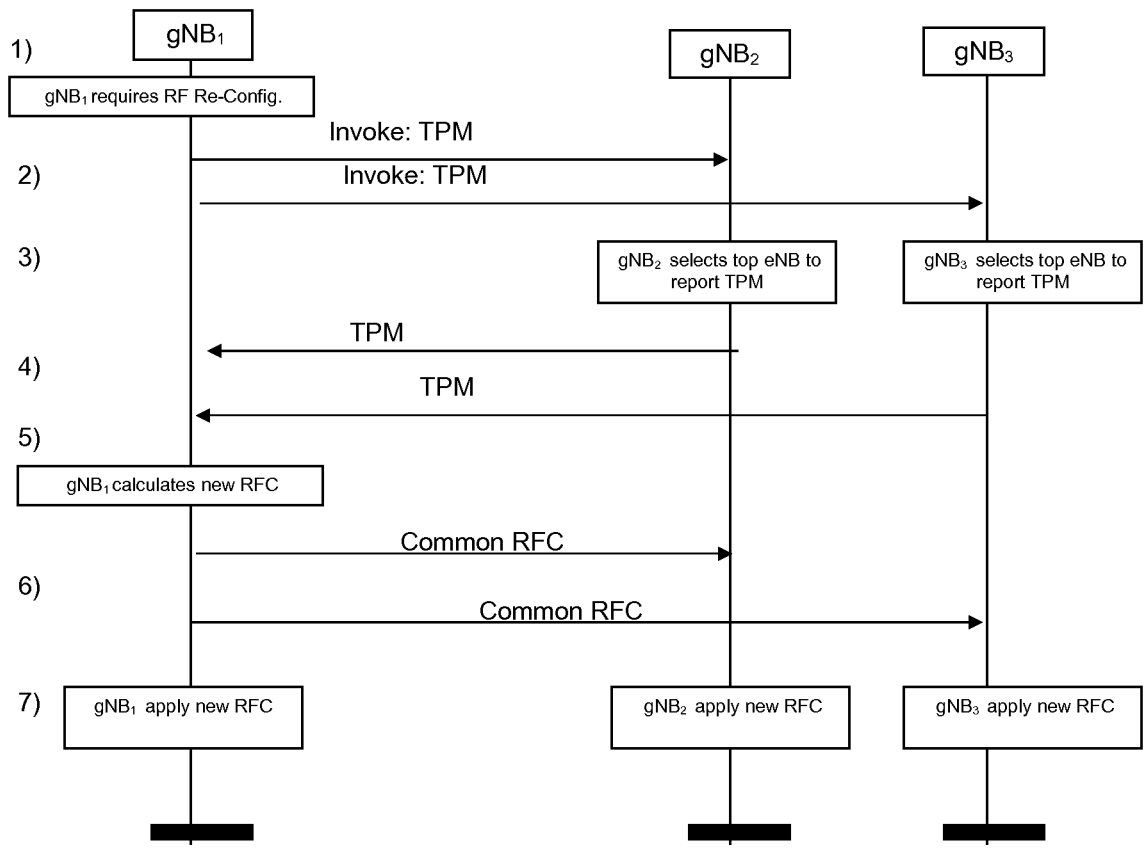
FIG. 4 shows a procedure for Common Radio Frame Reconfiguration—option 1.

The example procedure, which is depicted on FIG. 4 is as follows:

1) gNB1 decides to start RFC update procedure based on its own traffic measurements (such as RLC buffer status or packet delay for example).
2) Requesting gNB1 sends Traffic Priority Metric together with invoke for the same information to all gNBs in the cluster. The intention is to collect information about TPM's from all gNBs in one temporary place.
3) In case that there are more than one requesting gNBs, the reporting gNBs should choose the one with higher TPM to report to. In case that a requesting gNB receive requests from another cell, it may ignore that request if its own TPM has higher priority. Otherwise, it may send the requested information.
4) gNBs send theirs TPM information element to gNB1.
5) gNB1 receives all feedback and recalculate RFC optimal for all cells.
6) gNB1 sends new RFC message to all gNBs in the cluster.
7) All gNBs have to follow the new RFC.

A requesting gNB may start negotiations that would lead to application of individual TDD radio frame configurations if its initial new RFC request is overruled by a higher-TPM gNBs. This solution does not address the problem of TDD RFC misalignment on the cluster edge.

Common Radio Frame Reconfiguration—Option 2 (Corresponding to Phase I in FIG. 7)

In this section, an alternative approach for RFC is proposed. The basic difference from the first proposed solution is that instead of massive exchanging of TPM information, gNBs may make decision individually and the requesting gNB will have to respond to the entire set of individual decisions about adopting or rejecting new RFC.

Figure 5:
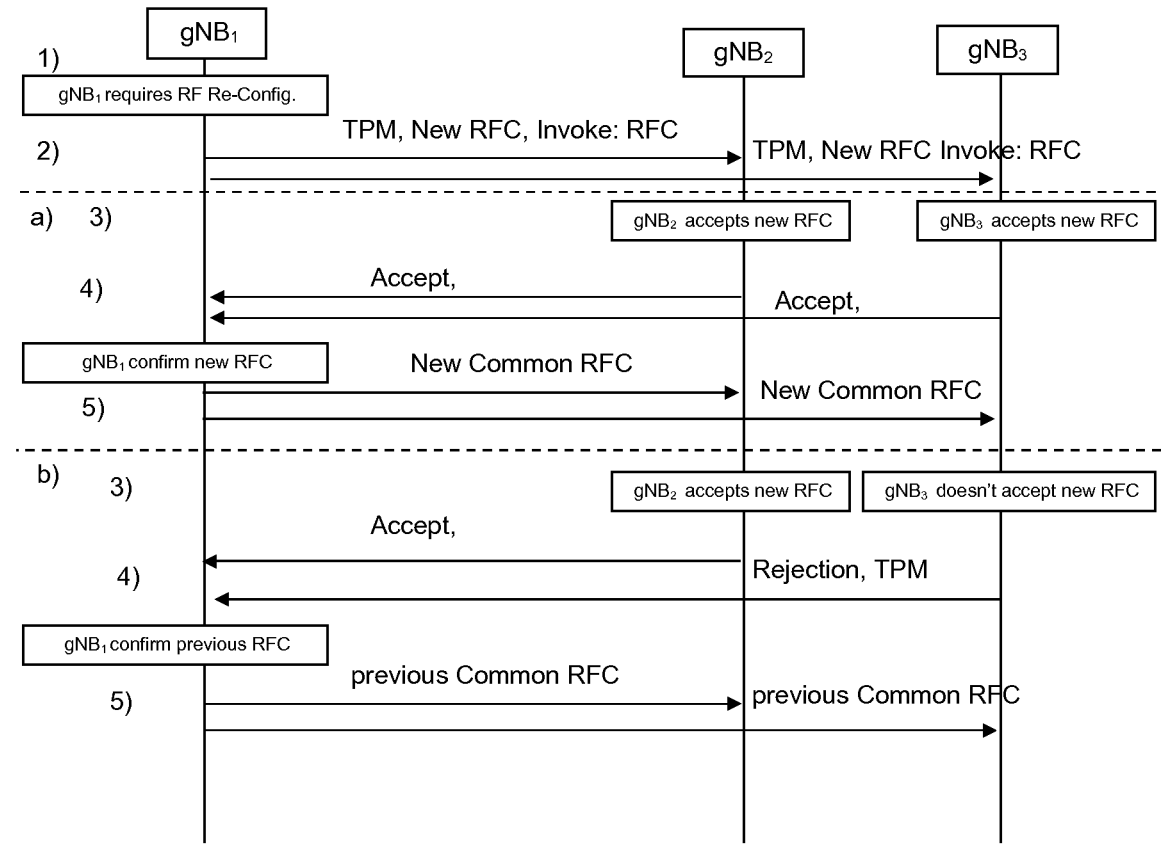
FIG. 5 shows a procedure for Common Radio Frame Reconfiguration—option 2.

The example procedure depicted on FIG. 5 may be perform as follows:

1) gNB1 decides to start RFC change procedure based on its own traffic measurements (such as RLC buffer status or other QoS related KPI's for example).
2) gNB1 sends to all gNBs proposed new RFC and an invoke requesting a RFC acceptance.

Information may also include a TPM to solve priority issue.

3) gNB2 and gNB3 compare their own TPM and the TPM sent by requesting gNB1. If there were more requesting gNBs, the one with highest TPM is considered.

a) If gNBs Accept New RFC
4) other gNBs may respond with message indicating that new RFC is accepted (optionally with TPM).
5) gNB1 can confirm the change such as, for example, by resending a new RFC, confirmation message, or not react at all, assuming that after required time for sending feedback exceeds, all gNBs may adopt new RFC.

b) If at Least One gNBs Did not Accept Change for RFC.
4) The rejecting gNB may respond to the requesting gNB with a message indicating that previous RFC setup is the preferred. In the same Xn message rejecting gNB may also include TPM report. This information may be utilized later by requesting gNB1 to continue negotiation to allow nonaligned TDD radio frames.
5) The base station, such as gNB1, should inform all involved gNBs about final result by sending previous RFC. In the same message gNB1 could include request for individual TDD configuration (see next procedure).

The conditions in which new RFC proposal is accepted or rejected may not be strictly standardized, but can instead be left open for vendors how to implement. Similarly, to the previous case this solution does not address TDD RFC misalignment on the cluster edge.

This solution may be combined with e-ICIC (enhanced inter-cell interference coordination) techniques while in step a) gNBs may accept the new configuration and send ABS (Almost Blank Subframe) Information IE to indicate that gNB will not use changed subframe in reversed direction and will mute on this resource. It might be especially useful where multiple sectors on the same site need to be perfectly aligned and created cross link interference will unable any transmissions. To indicate muting the gNBs may indicate "Almost Blank Subframe Information" IE or similar, together with "Associated Subframe" IE to indicate resources.

Radio Frame Reconfiguration with not Aligned UL/DL Allocation in Adjacent Cells (Corresponding to Phase II in FIG. 7)

This is an assumption that gNB will be able to negotiate with neighbour cells over the use of different nonaligned TDD RFC. After first phase of negotiations (described as options 1 and 2 above) related with setting up new Common TDD RFC individual nodes may begin second phase of negotiations. For this purpose, gNBs may be capable of measuring and estimating the extent of cross-link interference from available measurements as well as determining required actions to decrease it.

Figure 6:
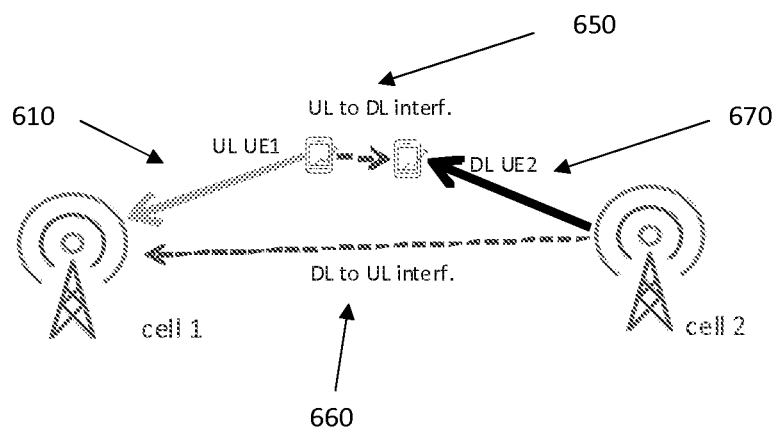
FIG. 6 shows a source of cross link interference.

FIG. 6 illustrates a source of cross-link interference. As shown in FIG. 6:

The first simple estimation is path loss 660 between two cell gNBs. It may be based on the long term measurement perform in the time when cell is less loaded. If the value is low than it means that for both cells DL to UL interference measured at the gNBs antennas will be also low.

The second estimation is related with UL to DL interference 650 for cell edge UE's located in adjacent cells. In this case, gNBs may have full measurement reports from owned UE's (UE1 FIG. 6). If UL resources 610 of a gNB such as in cell 1 is so limited that it is inevitably required to schedule cell edge UE's, even in the non-aligned part of a TDD radio frame, then heavy cross link interference could be expected to be caused on the DL-scheduled UE2 670 located at the edge of the adjacent cell. However, for this case, interference can be still acceptable if the adjacent cell can restrict DL scheduling only to UE's located at the cell-centre in attempt to maximise path loss between two groups of UEs (simultaneously UL- and DL-scheduled UE's). The exact agreements on which cell should limit UE scheduling could be a part of the negotiation.

The negotiations may not start if there was a heavy cross link interference between cells in the past that it leads to the recovery procedure. The expiration time after when this information is not valid may be defined, same as additional conditions for major traffic changes in the network that would make this information outdated.

The negotiation procedure may allow individual TDD configuration adjustment on one of the cells while rest of the cells could use Common TDD radio frame configuration.

The procedure may start immediately after the first part of the negotiations when gNBs request for Common RFC update has been rejected (by algorithm (in option 1) or directly by other cells (in option 2)). The cell has basic information about TPM of other cells and RFC that they want to adopt in next steps, so base station can estimate chance of success of the second step of negotiation.

During the procedure gNB may negotiate with adjacent cells (most likely not all cells in the cluster) the conditions under which RFC may be adjusted. As exact cross link interference are not known, the negotiations may consider adjustment of only one slot or subframe and, if it performs well, then in next radio frames negotiations can incrementally allow to use more slots or subframes in non-aligned directions. The result of the procedure depends on the state of the neighbour cells:

- When neighbour cell is not fully loaded it can mute on the desired slot or subframe.
- When neighbour cell has lower traffic demand than requesting gNB (calculated from TPM), but it is fully loaded then cells should be able to adjust TDD configuration with respect to requested slot and/or subframe. The requesting cell should indicate would it be possible for itself to limit scheduled users to cell centre user or not. If both cells could limit users than it should be done. Otherwise it should be done only by UE with lower TPM (such as, for example, by means of UL/DL user selection or DL power reduction).
- When neighbour gNB has significantly higher priority (TPM), and there is no possibility to limit cross link interference, then the requesting gNB may withdraw the request.

An example of the negotiation process is also presented on FIG. 7.

To show more details about gNBs behaviour in the second phase of negotiations, we present below two example cases where two gNB are requesting individual RFC reconfiguration in the same time, but in opposite directions. In the later part we present message flow chart used for communication over Xn/X2 interface.

Figure 8:
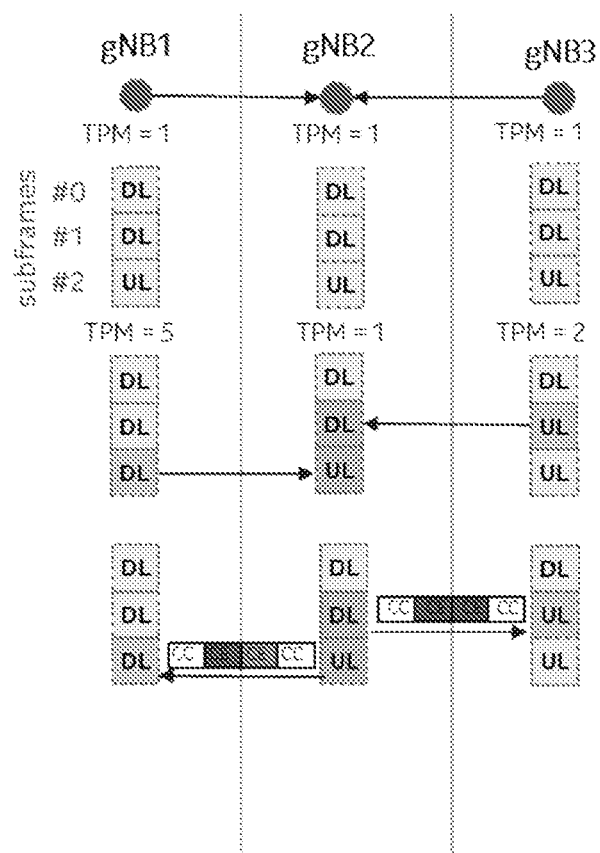
FIG. 8 shows a subframe reconfiguration in Case 1.
Figure 9:
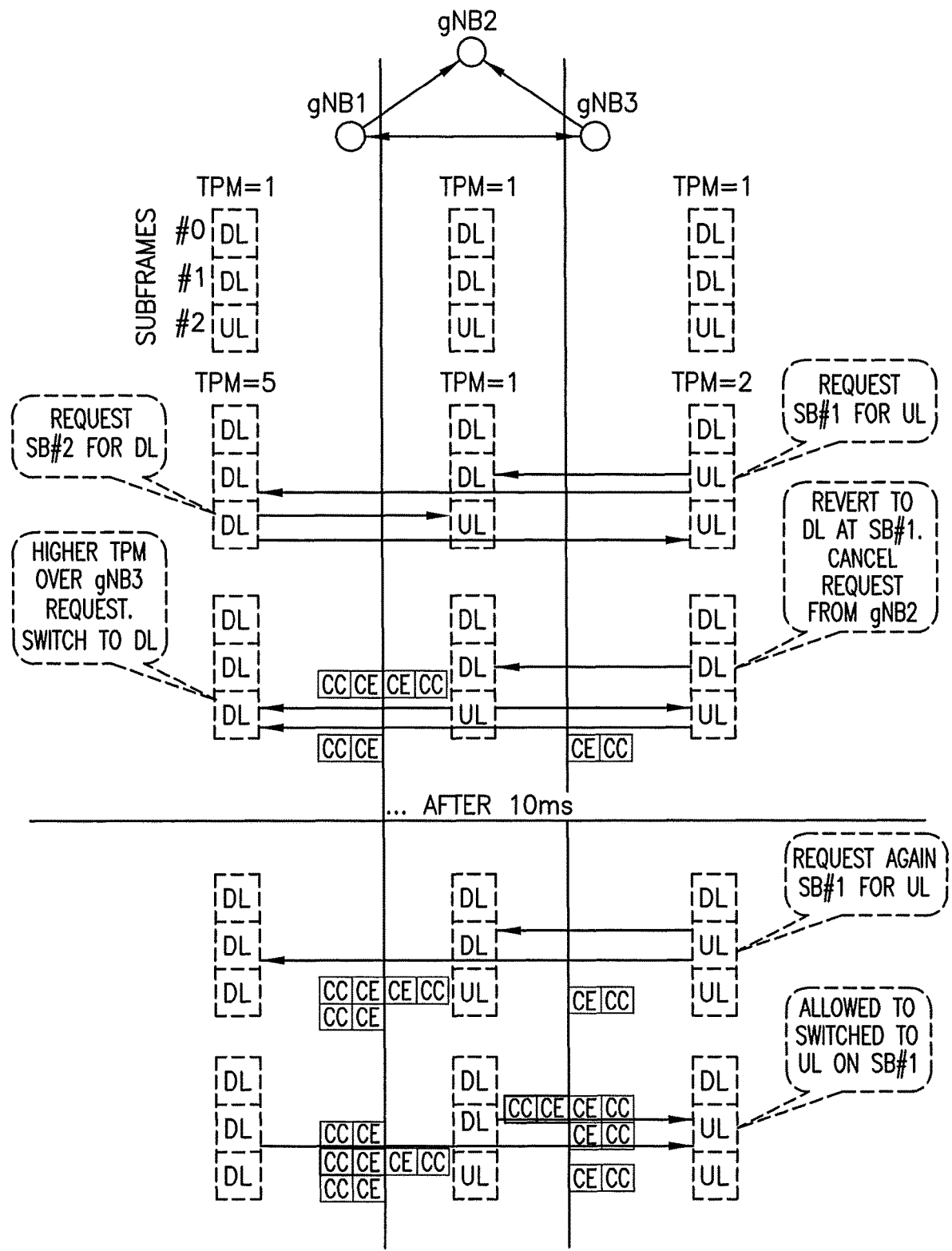
FIG. 9 shows Subframe reconfiguration in Case 1.

FIG. 8 and FIG. 9 each show a subframe reconfiguration in a Case 1 and a Case 2, respectively, in accordance with example embodiments of the invention as at least described below.

Case 1: Two isolated Cells (gNB1&3) Agree on Adjustment Conditions with One Cell (gNB2) that is in Close Distance to Both.

- In this case gNB2 will suffer from cross interference from gNB 1&3, but the interference level between 1&3 is very limited.
- At the beginning, all gNBs use the same TDD radio frame configuration {DL, DL, UL} (for simplicity, sequences of 3 subframes are depicted in FIG. 8 to represent whole radio frame) and they have very similar traffic load represented here by TPM value.
- Next, gNB1 has increased TPM value and request more DL subframes for SB #2, gNB3 has slightly increased TPM value and request adjustment of SB #1 in favour of UL. Information about planed adjustments and TPM values are sent to gNB2, whose status have not changed, because it is the closest neighbour of gNB1&3.
- In response to gNB1, gNB2 accepts DL adjustment on SB #2 and indicate how cells should behave regarding cell edge (CE) user scheduling. Although gNB1 has higher TPM, gNB1 will have to limit transmissions only to cell center (CC) UE's in SB #2, because gNB2 has cell edge UL users and no more UL resources to use but SB #2. This is indicated on the FIG. 8 as a set of boxes where traffic lights colours (green/red) indicates agreed setup for cell edge UE scheduling allowance, visible also in full scale on the bottom of the FIG. 8.
- In response to gNB3, gNB2 also accepts UL adjustment on SB #1 but it requires to limit transmission only to cell center UE's on both sides.
- For completeness of the procedure, it is needed that cells adjusting slot/subframes individually confirm finally that it will take place after receiving feedback from all involved cells Case 2: Three Cells Agree Transmission Conditions, as they are in Close Distance to Each Other.

In Case 2, similarly to case 1, gNB1 needs to adjust SB #2 for DL, gNB3 needs to adjust SB #1 for UL and gNB2 does not need any change in the previous common TDD configuration, but all cells are in the close distance to each other and might suffer from cross link interference. Corresponding scenario is visible in FIG. 9.

Figure 10:
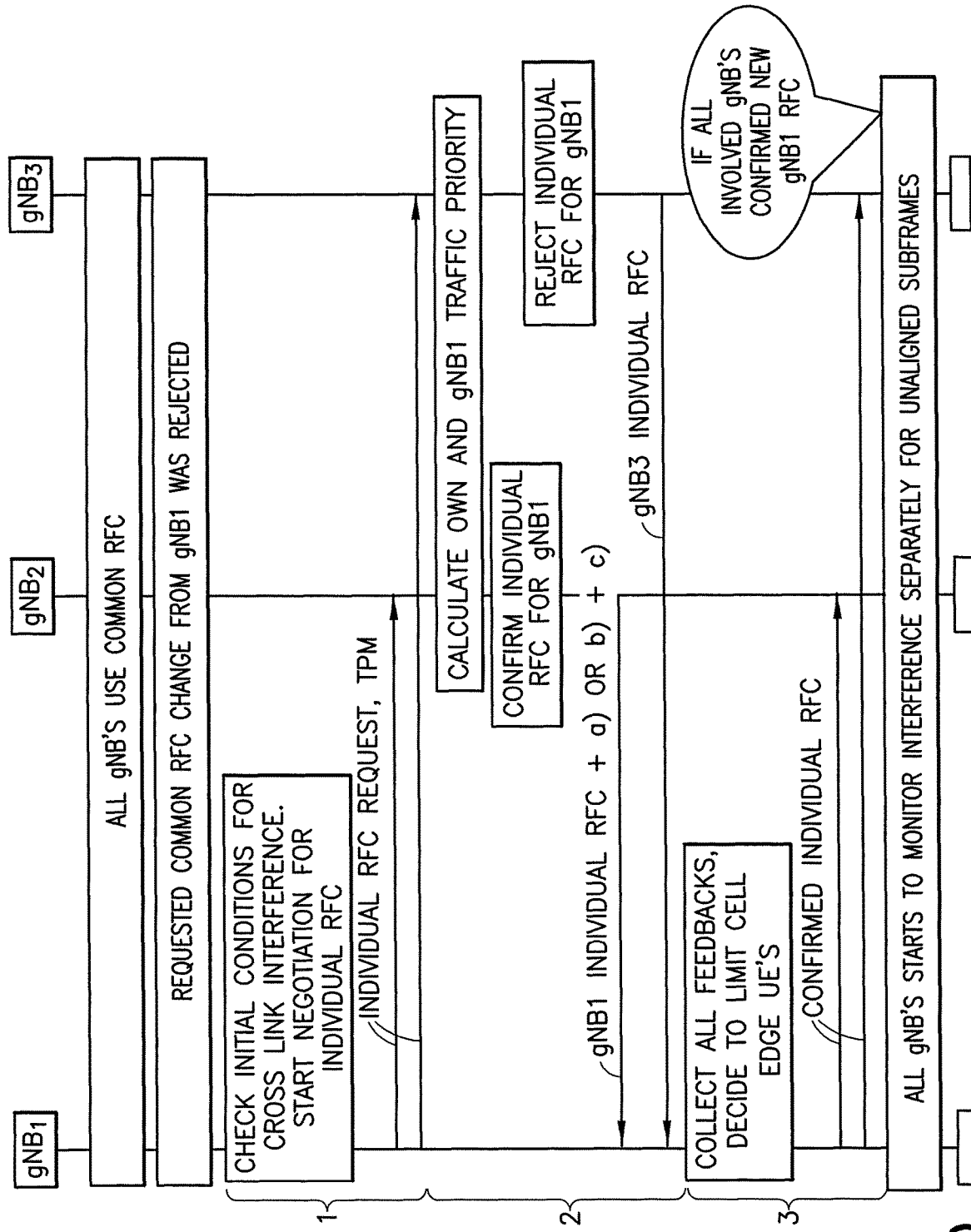
FIG. 10 shows a Xn/X2 message flow chart for negotiations of not aligned.

- gNB1 & gNB3 sends information about planed adjustments. In this case messages are also exchanged between gNB1 and gNB3 directly.
- gNB2 responds in exactly the same way as in Case 1.
- gNB1&3 notice that they compete over two subframes and if they would both succeed; cross link interference may appear on the two subframes in the same time
- To prevent from allowing larger changes in single negotiations, gNB3, as it has lower TPM in comparison to gNB1, decide to remain on DL direction for SB #1 and inform about this gNB2 by additional message. gNB2 & gNB3 agree on the cell edge conditions with gNB1.
- Before the next round of negotiations (depends on exact Xn/X2 delay but ideally it could be during next Radio Frame gNB1 and gNB3 are much more aware of measured cross link interference. This may impact cells decisions on renegotiation, immediate recover or continuation of the procedure. In the case gNB3 again signals the need of SB #1 adjustment for UL and receive acknowledgment with conditions for cell edge users from the rest of gNBs.
- For completeness of the procedure, it is needed that cells adjusting slots/subframes individually confirm finally that it will take place after receiving feedback from all involved cells The corresponding Xn message flows are depicted on FIG. 10 and described as below.

1) In the first step gNB1 sends messages to gNBs that might experience cross-link interference after slot/subframe adjustment. Message contains:

"Individual RFC request" IE that is indicating need of individual switch of the link direction on one particular subframe (single change in comparison to previous used RFC) It may also include optional information about possible limitation for scheduler to schedule only cell center UE's in particular slot/subframe.

Traffic Priority Metric IE.

Invoke indication IE (for RFC IE).

2) All involved gNB's compare traffic priorities with gNB1's priority, make decision and send response back to gNB1, which includes:

If it allows the change it sends back the repetition of gNB1 "Individual RFC" IE together with information about optional scheduling limitations for own cell edge UE's in the slot/subframe that was changed by request. Message can include additional information like:

a) If gNB1 change directions in favor of DL (gNB1-DL & gNBx-UL) feedback should include:

"UL Interference Overload Indication" and "Extended UL Interference Overload Information" together with "Associated Subframes" IE (following L It definitions for eIMTA solutions)— to indicate DL cross interference expected from gNB1 in UL subframes of gNBx. DL cross interference might be estimated or coming from measurements.

b) If gNB1 change directions in favor of UL (gNB1-UL & gNBx-DL) feedback might include:

"UL High Interference Indication" IE together with "Associated Subframes" For example, if gNBx would be not able to tolerate cross link interference from UL users of neighbor cells (e.g. it will have to schedule DL cell edge users in particular slot/subframe), then it might request from gNB1 to limit transmissions only to cell center UEs. Decision to request this from gNB1 can be based on priority calculated from received TPM. Must be send together with AS IE.

c) In both cases gNBx can send ABS Information to gNB1 as indication that it will mute on listed subframes (or slots).

If adjustment is not possible gNBx can finish negotiation by sending own RFC to gNB1. The reasons why the cell doesn't allow adjustment might come from own higher needs for resources in particular direction, traffic is coming from/to cell edge UE's and estimated crosslink interference will probably corrupt link performance.

3) When gNB1 collects feedback from all other gNBs, it may decide to limit or not to limit the cell edge UE's and may generate message to all gNB's in cluster:

"Individual RFC" IE—confirmed after received feedback, and:

a) If gNB1 change directions for DL (gNB1-DL & gNBx-UL), gNB1 can signal:

"UL High Interference Indication" IE together with "Associated Subframes" IE for changed subframe to confirm request from gNBx of necessary limitation for schedules to cell center UEs schedules.

The use of Information Elements to limit scheduling of the cell edge users during subframe (or slot) with possible cross-link interference is not mandatory part of the procedure and can be skipped. In that case, UL&DL scheduler may assume that any UE can be scheduled in considered slot/subframe.

The procedure is dedicated to be used for cells inside cluster, but it can be also applied for cells on the cluster boarder. In this case the first phase of negotiations related with RFC for cluster of cells may be skipped and algorithm may start work directly from second phase of the procedure.

Recovery from High Interference

The recovery procedure may be triggered only by gNB that previously allowed other gNB to deviate from aligned TDD configuration and experience performance decrease (such as traffic KPI's drops below target for example).

The request is send by gNB3 (FIG. 11) to gNB1.

gNB1 respond to all involved gNBs with RFC configuration.

The information about procedure may be noted by all involved gNBs. This may be used to prevent cells from repeating complex negotiations until this information become obsolete due to the changes in traffic conditions or aligned RFC.

Figure 11:
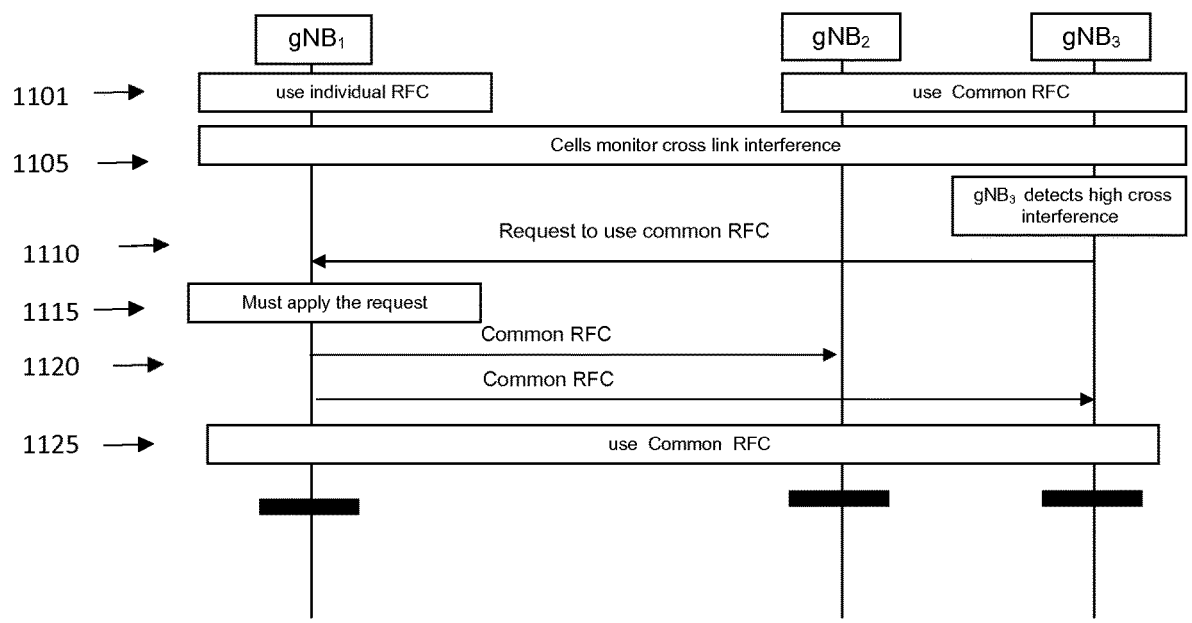
FIG. 11 shows a Xn/X2 message flow chart for quick recovery.

FIG. 11 shows an Xn/X2 message flow chart for quick recovery. As shown in FIG. 11 at step 1101 the gNB1 uses individual RFC while the gNB2 and gNB3 use common RFC. As shown in step 1105 of FIG. 11 the cells monitor cross link interference. At step 1110 of FIG. 11 the gNB3 sends a request to gNB1 to use common RFC. At step 1115 of FIG. 11 the gNB1 must apply the request. Then as shown in step 1120 of FIG. 11 the common RFC is provided to both gNB2 and gNB3. Then as shown in step 1125 of FIG. 11 the gNB1, gNB2 and gNB3 each use the common RFC.

Figure 1A:
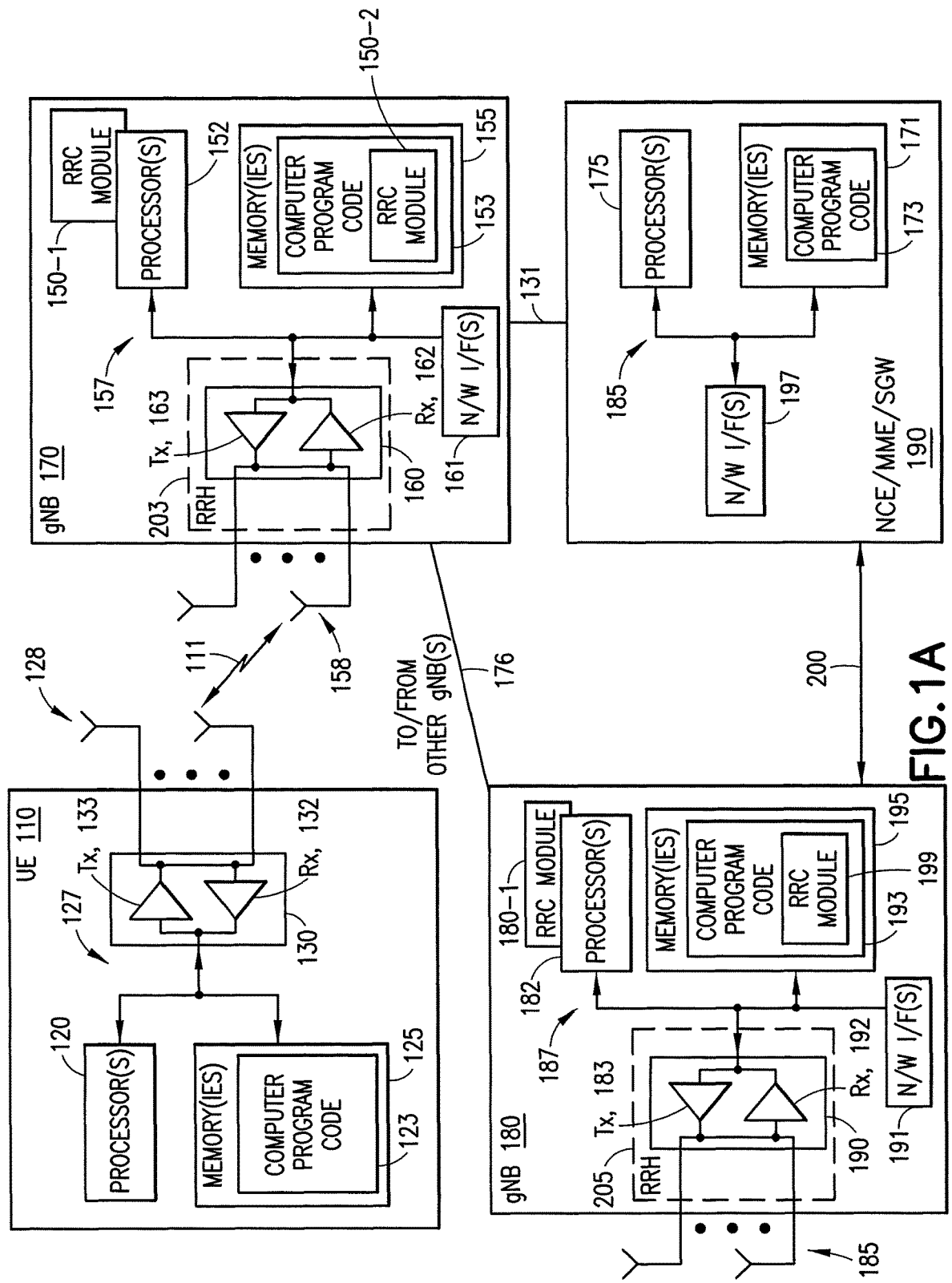
FIG. 1A shows a high level block diagram of various devices used in carrying out various aspects of the invention.

With regards to the example embodiments of the invention, reference is made to FIG. 1A for illustrating a simplified block diagram of various electronic devices that are suitable for use in practicing the example embodiments of the invention.

FIG. 1A shows a block diagram of one possible and non-limiting exemplary system in which the example embodiments of the invention may be practiced. In FIG. 1a, a user equipment (UE) 110 is in wireless communication with a wireless network 100. A UE is a wireless, typically mobile device that can access a wireless network. The UE 110 includes one or more processors 120, one or more memories 125, and one or more transceivers 130 interconnected through one or more buses 127. Each of the one or more transceivers 130 includes a receiver Rx, 132 and a transmitter Tx 133. The one or more buses 127 may be address, data, or control buses, and may include any interconnection mechanism, such as a series of lines on a motherboard or integrated circuit, fiber optics or other optical communication equipment, and the like. The one or more transceivers 130 are connected to one or more antennas 128. The one or more memories 125 include computer program code 123. The UE 110 communicates with gNB 170 and/or gNB 180 via a wireless link 111 and/or the one or more antennas 128.

The gNB 170 (NR/5G Node B or possibly an evolved NB) is a base station such as but not limited to a primary or secondary node base station (e.g., for NR or LTE long term evolution) that communicates with devices such as gNB 180 and UE 110 of FIG. 1A. The gNB 170 provides access to wireless devices such as the UE 110 to the wireless network 100. The gNB 170 includes one or more processors 152, one or more memories 155, one or more network interfaces (N/W I/F(s)) 161, and one or more transceivers 160 interconnected through one or more buses 157. In accordance with the example embodiments these network interfaces 161 can include X2 and/or Xn interfaces for use to perform the example embodiments of the invention. Each of the one or more transceivers 160 includes a receiver Rx 162 and a transmitter Tx 163. The one or more transceivers 160 are connected to one or more antennas 158. The one or more memories 155 include computer program code 153. The gNB 170 includes a RRC Module 150 which is configured to perform example embodiments of the invention as described herein. The RRC Module 150 comprising one of or both parts 150-1 and/or 150-2, which may be implemented in a number of ways. The RRC Module 150 may be implemented in hardware as RRC Module 150-1, such as being implemented as part of the one or more processors 152. The RRC Module 150-1 may be implemented also as an integrated circuit or through other hardware such as a programmable gate array. In another example, the RRC Module 150 may be implemented as RRC Module 150-2, which is implemented as computer program code 153 and is executed by the one or more processors 152. For instance, the one or more memories 155 and the computer program code 153 are configured to cause, with the one or more processors 152, the gNB 170 to perform one or more of the operations as described herein. The one or more network interfaces 161 communicate over a network such as via the links 176 and 111. Two or more gNB 170 may communicate with another gNB or eNB using, e.g., link 176. Further, the link 176 may be wired or wireless or both and may implement, e.g., an X2 or Xn interface. Further the link 176 may be through other network devices such as, but not limited to an NCE/MME/SGW device such as the NCE/MME/SGW 190 of FIG. 1A.

The gNB 180 (NR/5G Node B or possibly an evolved NB) is a base station such as a master node base station (e.g., for NR or LTE long term evolution) that communicates with devices such as the gNB 170 and/or UE 110 and/or the wireless network 100. The gNB 180 includes one or more processors 182, one or more memories 195, one or more network interfaces (N/W I/F(s)) 191, and one or more transceivers 190 interconnected through one or more buses 187. In accordance with the example embodiments these network interfaces 191 can include X2 and/or Xn interfaces for use to perform the example embodiments of the invention. Each of the one or more transceivers 190 includes a receiver Rx 192 and a transmitter Tx 183. The one or more transceivers 190 are connected to one or more antennas 185. The one or more memories 195 include computer program code 193. The gNB 180 also includes a RRC Module 199 which is configured to perform example embodiments of the invention as described herein. The RRC Module 199 may be implemented in hardware as RRC Module 180-1, such as being implemented as part of the one or more processors 182. The RRC Module 180-1 may be implemented also as an integrated circuit or through other hardware such as a programmable gate array. In another example, the RRC Module 180-1 may be implemented as RRC Module 199, which is implemented as computer program code 193 and is executed by the one or more processors 182. For instance, the one or more memories 155 and the computer program code 153 are configured to cause, with the one or more processors 182, the gNB 180 to perform one or more of the operations as described herein. The one or more network interfaces 181 communicate over a network such as via the link 176. Two or more gNB 170 or gNB 180 may communicate with another gNB and/or eNB or any other device using, e.g., link 176. The link 176 may be wired or wireless or both and may implement, e.g., an X2 or Xn interface. Further, as stated above the link 176 may be through other network devices such as, but not limited to an NCE/MME/SGW device such as the NCE/MME/SGW 190 of FIG. 1A.

The one or more buses 157 and 187 may be address, data, or control buses, and may include any interconnection mechanism, such as a series of lines on a motherboard or integrated circuit, fiber optics or other optical communication equipment, wireless channels, and the like. For example, the one or more transceivers 160 and/or 190 may be implemented as a remote radio head (RRH) 203 and/or 205, with the other elements of the gNB 170 being physically in a different location from the RRH, and the one or more buses 157 could be implemented in part as fiber optic cable to connect the other elements of the gNB 170 to a RRH.

It is noted that description herein indicates that "cells" perform functions, but it should be clear that the gNB that forms the cell will perform the functions. The cell makes up part of a gNB. That is, there can be multiple cells per gNB.

The wireless network 100 may include a network control element (NCE) 190 that may include MME (Mobility Management Entity)/SGW (Serving Gateway) functionality, and which provides connectivity with a further network, such as a telephone network and/or a data communications network (e.g., the Internet). The gNB 170 is coupled via a link 131 to the NCE 190. The gNB 180 is coupled via a link 200 to the NCE 190. Further, the gNB 180 is coupled via link 176 to the gNB 170. The links 131, 176, and/or 200 may be implemented as, e.g., an S1 interface.

The NCE 190 includes one or more processors 175, one or more memories 171, and one or more network interfaces (N/W I/F(s)) 197, interconnected through one or more buses coupled with the link 185. In accordance with the example embodiments these network interfaces 197 can include X2 and/or Xn interfaces for use to perform the example embodiments of the invention. The one or more memories 171 include computer program code 173. The one or more memories 171 and the computer program code 173 are configured to, with the one or more processors 175, cause the NCE 190 to perform one or more operations which may be needed to support the operations in accordance with the example embodiments of the invention.

The wireless network 100 may implement network virtualization, which is the process of combining hardware and software network resources and network functionality into a single, software-based administrative entity, a virtual network. Network virtualization involves platform virtualization, often combined with resource virtualization. Network virtualization is categorized as either external, combining many networks, or parts of networks, into a virtual unit, or internal, providing network-like functionality to software containers on a single system. Note that the virtualized entities that result from the network virtualization are still implemented, at some level, using hardware such as processors 152, 182, or 175 and memories 155, 195, and 171, and also such virtualized entities create technical effects.

The computer readable memories 125, 155, 171, and 195 may be of any type suitable to the local technical environment and may be implemented using any suitable data storage technology, such as semiconductor based memory devices, flash memory, magnetic memory devices and systems, optical memory devices and systems, fixed memory and removable memory. The computer readable memories 125, 155, 171, and 195 may be means for performing storage functions. The processors 125, 155, 171, and 195 may be of any type suitable to the local technical environment, and may include one or more of general purpose computers, special purpose computers, microprocessors, digital signal processors (DSPs) and processors based on a multi-core processor architecture, as non-limiting examples. The processors 120, 152, 175, and 182 may be means for performing functions, such as controlling the UE 110, gNB 170, gNB 180, to operate with the functions as described herein.

In general, the various embodiments of the user equipment 110 can include, but are not limited to, cellular telephones such as smart phones, tablets, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, tablets with wireless communication capabilities, as well as portable units or terminals that incorporate combinations of such functions.

In an example embodiment at least some of the functionalities of the apparatuses gNB 170 and gNB 180 may be shared between two or more physically separate devices forming one operational entity. Therefore, the apparatus may be seen to depict the operational entity comprising one or more physically separate devices for executing at least some of the described processes. The apparatus utilizing such shared architecture, may comprise a remote control unit (RCU), such as a host computer or a server computer, operatively coupled (such as via a wireless or wired network for example) to a remote radio head (RRH) located in the base station. In an example embodiment, at least some of the described processes may be performed by the RCU. In an example embodiment, the execution of at least some of the described processes may be shared among the RRH and the RCU. In an example embodiment, the RCU may generate a virtual network through which the RCU communicates with the RRH.

In general, virtual networking may involve a process of combining hardware and software network resources and network functionality into a single, software-based administrative entity, a virtual network. Network virtualization may involve platform virtualization, often combined with resource virtualization. Network virtualization may be categorized as external virtual networking which combines many networks, or parts of net-works, into the server computer or the host computer (i.e. to the RCU). External network virtualization may be targeted to optimized network sharing. Another category is internal virtual networking which provides network-like functionality to the software containers on a single system. Virtual networking may also be used for testing the terminal device. In an example embodiment, the virtual network may provide flexible distribution of operations between the RRH and the RCU. In practice, any digital signal processing task may be performed in either the RRH or the RCU and the boundary where the responsibility is shifted between the RRH and the RCU may be selected according to implementation.

For the purposes of describing various exemplary embodiments in accordance with this invention the UE 110, the gNB 170, and/or the gNB 180 may also include dedicated processors, for example RRC modules 150-1 and a corresponding RRC module 150-2 for gNB 170 and RRC modules 180-1 and a corresponding RRC module 199 for gNB 180. These RRC modules may be constructed so as to operate in accordance with various exemplary embodiments in accordance with this invention.

In general, the various embodiments of the UE 110 can include, but are not limited to, cellular telephones, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions.

The computer readable Memory(ies) 125, 155, and 195 may be of any type suitable to the local technical environment and may be implemented using any suitable data storage technology, such as semiconductor based memory devices, flash memory, magnetic memory devices and systems, optical memory devices and systems, fixed memory and removable memory. The Processor(s) 120, 152, and 182 may be of any type suitable to the local technical environment, and may include one or more of general purpose computers, special purpose computers, microprocessors, digital signal processors (DSPs) and processors based on a multicore processor architecture, as non-limiting examples. The wireless interfaces (e.g., RRH 130, 203, and 190) may be of any type suitable to the local technical environment and may be implemented using any suitable communication technology such as individual transmitters, receivers, transceivers or a combination of such components.

An example method may comprising transmitting by an entity in a cell to at least one other neighboring cell of a cluster of cells a request signal indicating a desire to change from a first common radio frame configuration (RFC) with the at least one other neighboring cell to a second different common radio frame configuration (RFC); and upon receiving a feedback signal from the at least one other neighboring cell selecting either: implementing the change at the cell from the first common radio frame configuration (RFC) to the second common radio frame configuration (RFC) when the feedback signal indicates acceptance of the change, or implementing a change at the cell from the first common radio frame configuration (RFC) to a different individual local radio frame configuration (RFC) when the feedback signal indicates rejection of the change.

An example embodiment may be provided in an apparatus comprising at least one processor; and at least one non-transitory memory including computer program code such as shown in FIG. 1A for example, the at least one memory and the computer program code configured to, with the at least one processor, cause the apparatus to: transmit by the apparatus in a cell, to at least one other neighboring cell of a cluster of cells, a request signal indicating a desire to change from a first common radio frame configuration (RFC) with the at least one other neighboring cell to a second different common radio frame configuration (RFC); and upon receiving a feedback signal from the at least one other neighboring cell select to either: implement the change at the cell from the first common radio frame configuration (RFC) to the second common radio frame configuration (RFC) when the feedback signal indicates acceptance of the change, and implement a change at the cell from the first common radio frame configuration (RFC) to a different individual local radio frame configuration (RFC) when the feedback signal indicates rejection of the change.

An example embodiment may be provided in a non-transitory program storage device readable by a machine, tangibly embodying a program of instructions executable by the machine for performing operations, the operations comprising: transmitting by an entity in a cell to at least one other neighboring cell of a cluster of cells a request signal indicating a desire to change from a first common radio frame configuration (RFC) with the at least one other neighboring cell to a second different common radio frame configuration (RFC); and upon receiving a feedback signal from the at least one other neighboring cell: implementing the change at the cell from the first common radio frame configuration (RFC) to the second common radio frame configuration (RFC) when the feedback signal indicates acceptance of the change, and implementing a change at the cell from the first common radio frame configuration (RFC) to a different individual local radio frame configuration (RFC) when the feedback signal indicates rejection of the change.

An example apparatus may be provided comprising means for transmitting by an entity in a cell to at least one other neighboring cell of a cluster of cells a request signal indicating a desire to change from a first common radio frame configuration (RFC) with the at least one other neighboring cell to a second different common radio frame configuration (RFC); and means for, upon receiving a feedback signal from the at least one other neighboring cell: implementing the change at the cell from the first common radio frame configuration (RFC) to the second common radio frame configuration (RFC) when the feedback signal indicates acceptance of the change, and implementing a change at the cell from the first common radio frame configuration (RFC) to a different individual local radio frame configuration (RFC) when the feedback signal indicates rejection of the change.

It should be understood that the foregoing description is only illustrative. Various alternatives and modifications can be devised by those skilled in the art. For example, features recited in the various dependent claims could be combined with each other in any suitable combination(s). In addition, features from different embodiments described above could be selectively combined into a new embodiment. Accordingly, the description is intended to embrace all such alternatives, modifications and variances which fall within the scope of the appended claims.

Figure 12A:
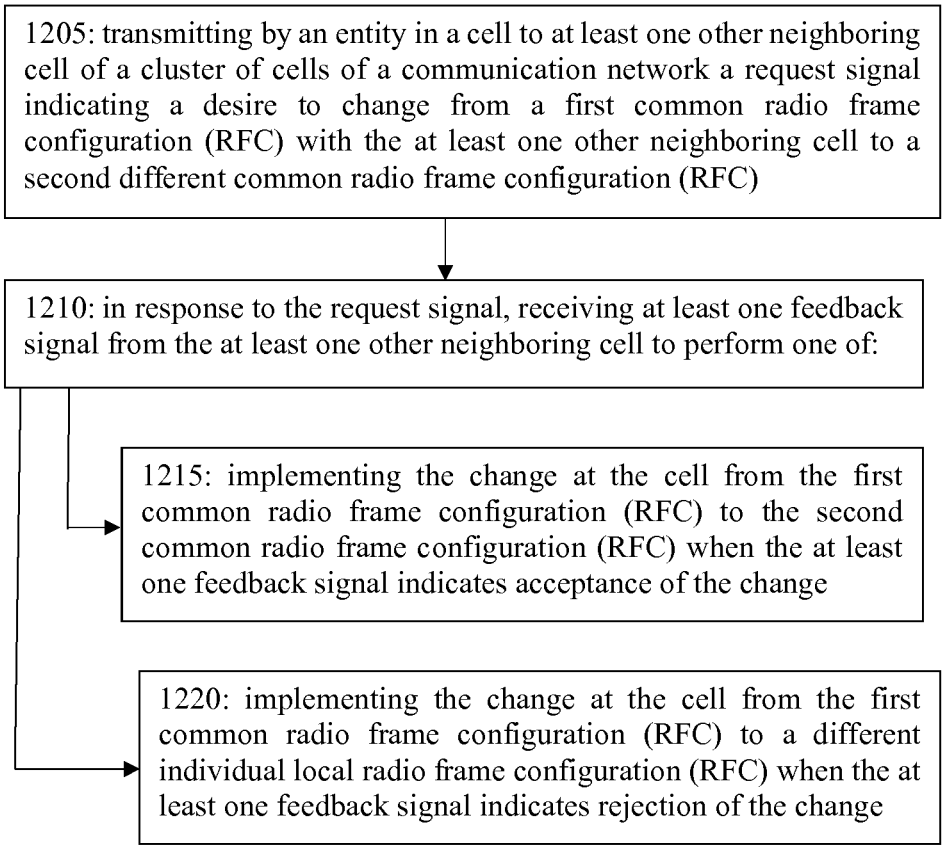
FIG. 12a and FIG. 12b each show a method in accordance with example embodiments of the invention which may be performed by an apparatus.

FIG. 12a illustrates operations which may be performed by a network device such as, but not limited to, a network node gNB 170 as in FIG. 1A. As shown in step 1205 of FIG. 12a there is transmitting by an entity in a cell to at least one other neighboring cell of a cluster of cells of a communication network a request signal indicating a desire to change from a first common radio frame configuration (RFC) with the at least one other neighboring cell to a second different common radio frame configuration (RFC); as shown in step 1210 of FIG. 12a there is, in response to the request signal, receiving at least one feedback signal from the at least one other neighboring cell to perform one of: as shown in step 1215 of FIG. 12a implementing the change at the cell from the first common radio frame configuration (RFC) to the second common radio frame configuration (RFC) when the at least one feedback signal indicates acceptance of the change, or as shown in step 1220 of FIG. 12a implementing the change at the cell from the first common radio frame configuration (RFC) to a different individual local radio frame configuration (RFC) when the at least one feedback signal indicates rejection of the change.

In accordance with the example embodiments as described in the paragraph above, the at least one feedback signal comprises an indication of traffic priority and a radio frame configuration for each cell of the cluster of cells.

In accordance with the example embodiments as described in the paragraphs above, the indication of traffic priority is based on an X2/Xn information element with traffic priority metric.

In accordance with the example embodiments as described in the paragraphs above, the at least one feedback signal comprises an indication of total GBR and non-GBR radio resource utilization at the cluster of cells for UL and DL traffic.

In accordance with the example embodiments as described in the paragraphs above, the indication of traffic priority is used to prioritize cells of the cluster of cells based on the total GBR and non-GBR radio resource utilization at the cluster of cells for the UL and DL traffic.

In accordance with the example embodiments as described in the paragraphs above, the cluster of cells for the request signal is indicated by an Operations, Administration and Maintenance node of the communication network.

In accordance with the example embodiments as described in the paragraphs above, the change from the first radio frame configuration is performed per subframe in time.

In accordance with the example embodiments as described in the paragraphs above, there is receiving acceptance of the change from the first common radio frame configuration from each of the at least one other neighboring cell.

In accordance with the example embodiments as described in the paragraphs above, the request signal comprises an indication of traffic measurements of the entity, wherein the indication of the traffic measurements of the entity comprises a radio link control buffer status or packet delay, and wherein the request signal is invoking each cell of the at least one other neighboring cell to send their indication of traffic measurements comprising a radio link control buffer status or packet delay of the each cell.

In accordance with the example embodiments as described in the paragraphs above, there is receiving signaling comprising the changed radio frame configuration with an aligned time division duplex configuration.

In accordance with the example embodiments as described in the paragraphs above, there is sending signaling to each of the at least one other neighboring cell to implement the changed radio frame configuration.

In accordance with the example embodiments as described in the paragraphs above, the exchanged information comprises preferences for a radio frame configuration based on a traffic capacity of the entity.

In accordance with the example embodiments as described in the paragraphs above, the node comprises an Operations, Administration and Maintenance node.

A computer program product comprising a non-transitory computer-readable medium (Memory(ies) 155 of FIG. 1A) storing program code (Computer Program Code 153 of FIG. 1A), the program code executed by at least one processor (Processors 152 and/or RRC module 150-1 and/or RRC Module 150-2 of FIG. 1A) to perform the operations as at least described in the paragraphs above.

In accordance with an example embodiment of the invention as described above there is an apparatus comprising: means for transmitting [RRH 203 as in FIG. 1A] by an entity [gNB 170 as in FIG. 1A] in a cell to at least one other neighboring cell of a cluster of cells of a communication network [network 100 as in FIG. 1A] a request signal [Computer Program Code 153, Memory(ies) 155, and Processor(s) 152, RRC Module 150-1 and/or RRC Module 150-2 as in FIG. 1A], indicating a desire to change from a first common radio frame configuration (RFC) with the at least one other neighboring cell to a second different common radio frame configuration (RFC); means, in response to the request signal, for receiving [RRH 203 as in FIG. 1A] at least one feedback signal from the at least one other neighboring cell to perform one of: implementing [Computer Program Code 153, Memory(ies) 155, and Processor(s) 152, RRC Module 150-1 and/or RRC Module 150-2 as in FIG. 1A] the change at the cell from the first common radio frame configuration (RFC) to the second common radio frame configuration (RFC) when the at least one feedback signal indicates acceptance of the change, or implementing [Computer Program Code 153, Memory(ies) 155, and Processor(s) 152, RRC Module 150-1 and/or RRC Module 150-2 as in FIG. 1A] the change at the cell from the first common radio frame configuration (RFC) to a different individual local radio frame configuration (RFC) when the at least one feedback signal indicates rejection of the change.

In the example aspect of the invention according to the paragraph above, wherein at least the means for transmitting, indicating, receiving and implementing comprises a non-transitory computer readable medium [Memory(ies) 155 as in FIG. 1A] encoded with a computer program [Computer Program Code 153 as in FIG. 1A] executable by at least one processor [Processor(s) 152, RRC Module 150-1 and/or RRC Module 150-2 as in FIG. 1A].

Figure 12B:
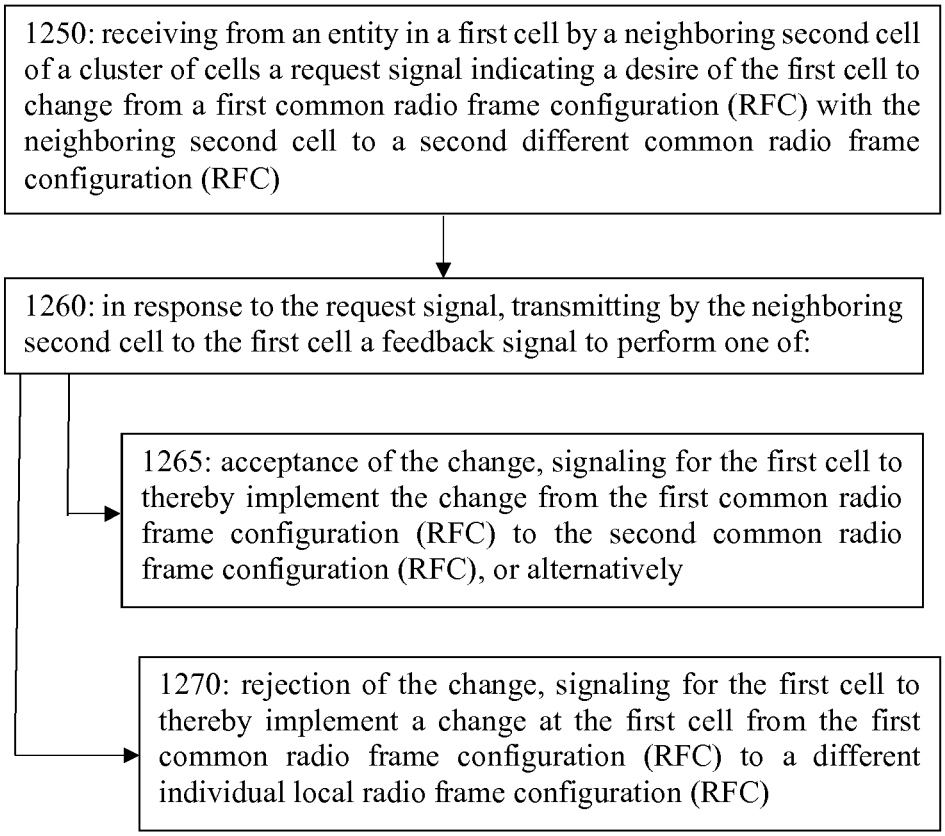

FIG. 12b illustrates operations which may be performed by a network device such as, but not limited to, a network node gNB 180 as in FIG. 1A. As shown in step 1250 of FIG.

12*b* there is receiving from an entity in a first cell by a neighboring second cell of a cluster of cells a request signal indicating a desire of the first cell to change from a first common radio frame configuration (RFC) with the neighboring second cell to a second different common radio frame configuration (RFC); as shown in step 1260 of FIG. 12*b* there is, in response to the request signal, transmitting by the neighboring second cell to the first cell a feedback signal to perform one of: as shown in step 1265 of FIG. 12*b* acceptance of the change, signaling for the first cell to thereby implement the change from the first common radio frame configuration (RFC) to the second common radio frame configuration (RFC), or alternatively, or as shown in step 1270 of FIG. 12*b* rejection of the change, signaling for the first cell to thereby implement a change at the first cell from the first common radio frame configuration (RFC) to a different individual local radio frame configuration (RFC).

In accordance with the example embodiments as described in the paragraph above, the request signal comprises an indication of traffic priority and a radio frame configuration for the entity in the first cell.

In accordance with the example embodiments as described in the paragraphs above, the indication of traffic priority is based on an X2/Xn information element with traffic priority metric.

In accordance with the example embodiments as described in the paragraphs above, the at least one feedback signal comprises an indication of total GBR and non-GBR radio resource utilization at the entity for UL and DL traffic.

In accordance with the example embodiments as described in the paragraphs above, the indication of traffic priority is used to prioritize cells of the cluster of cells based on the total GBR and non-GBR radio resource utilization at the cluster of cells for the UL and DL traffic.

In accordance with the example embodiments as described in the paragraphs above, the change from the first radio frame configuration is performed per subframe in time.

In accordance with the example embodiments as described in the paragraphs above, there is sending acceptance of the change for the first cell.

In accordance with the example embodiments as described in the paragraphs above, there is sending signaling comprising the changed radio frame configuration with an aligned time division duplex configuration to the neighboring second cell.

In accordance with the example embodiments as described in the paragraphs above, the request signal comprises an indication of traffic measurements of the entity, wherein the indication of the traffic measurements of the entity comprises a radio link control buffer status or packet delay, and wherein the request signal is invoking each cell of the at least one other neighboring cell to send their indication of traffic measurements comprising a radio link control buffer status or packet delay of the each cell.

In accordance with the example embodiments as described in the paragraphs above, the entity comprises an Operations, Administration and Maintenance node.

A computer program product comprising a non-transitory computer-readable medium (Memory(ies) 195 of FIG. 1A) storing program code (Computer Program Code 193 of FIG. 1A), the program code executed by at least one processor (Processors 182 and/or RRC module 180-1 and/or RRC Module 199 of FIG. 1A) to perform the operations as at least described in the paragraphs above.

In accordance with an example embodiment of the invention as described above there is an apparatus comprising: means for receiving [RRH 205 as in FIG. 1A] from an entity [gNB 170 as in FIG. 1A] in a first cell by a neighboring second cell of a cluster of cells a request signal indicating a desire of the first cell to change from a first common radio frame configuration (RFC) with the neighboring second cell to a second different common radio frame configuration (RFC); as shown in step 1260 of FIG. 12*b* there is, in response to the request signal, transmitting [RRH 205 as in FIG. 1A] by the neighboring second cell to the first cell a feedback signal [Computer Program Code 193, Memory(ies) 195, and Processor(s) 182, RRC Module 180-1 and/or RRC Module 199 as in FIG. 1A] to perform one of: as shown in step 1265 of FIG. 12*b* acceptance of the change, signaling [Computer Program Code 193, Memory(ies) 195, and Processor(s) 182, RRC Module 180-1 and/or RRC Module 199 as in FIG. 1A] for the first cell to thereby implement the change from the first common radio frame configuration (RFC) to the second common radio frame configuration (RFC), or alternatively, or as shown in step 1270 of FIG. 12*b* rejection of the change, signaling [Computer Program Code 193, Memory(ies) 195, and Processor(s) 182, RRC Module 180-1 and/or RRC Module 199 as in FIG. 1A] for the first cell to thereby implement a change at the first cell from the first common radio frame configuration (RFC) to a different individual local radio frame configuration (RFC).

In the example aspect of the invention according to the paragraph above, wherein at least the means for receiving, transmitting, and implementing comprises a non-transitory computer readable medium [Memory(ies) 195 as in FIG. 1A] encoded with a computer program [Computer Program Code 193 as in FIG. 1A] executable by at least one processor [Processor(s) 182, RRC Module 180-1 and/or RRC Module 199 as in FIG. 1A].

In general, the various embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

The word "exemplary" is used herein to mean "serving as an example, instance, or illustration." Any embodiment described herein as "exemplary" is not necessarily to be construed as preferred or advantageous over other embodiments. All of the embodiments described in this Detailed Description are exemplary embodiments provided to enable persons skilled in the art to make or use the invention and not to limit the scope of the invention which is defined by the claims.

The foregoing description has provided by way of exemplary and non-limiting examples a full and informative description of the best method and apparatus presently contemplated by the inventors for carrying out the invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention.

It should be noted that the terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and/or printed electrical connections, as well as by the use of electromagnetic energy, such as electromagnetic energy having wavelengths in the radio frequency region, the microwave region and the optical (both visible and invisible) region, as several non-limiting and non-exhaustive examples.

Furthermore, some of the features of the preferred embodiments of this invention could be used to advantage without the corresponding use of other features. As such, the foregoing description should be considered as merely illustrative of the principles of the invention, and not in limitation thereof.

The invention claimed is:

1. A method comprising:
    transmitting with an entity in a cell to at least one other neighboring cell of a cluster of cells of a communication network a request signal indicating a desire to change from a first common radio frame configuration with the at least one other neighboring cell to a second different common radio frame configuration, wherein the request signal comprises an indication of traffic measurements of the entity, wherein the indication of the traffic measurements of the entity comprises a radio link control buffer status or packet delay, and wherein the request signal is configured to invoke respective cells of the at least one other neighboring cell to send their indication of traffic measurements comprising a radio link control buffer status or packet delay of the respective cells; and
    in response to the request signal, receiving at least one feedback signal from the at least one other neighboring cell to perform one of:
        implementing a change at the cell from the first common radio frame configuration to the second common radio frame configuration when the at least one feedback signal indicates acceptance of the change, or
        implementing a change at the cell from the first common radio frame configuration to a different individual local radio frame configuration when the at least one feedback signal indicates rejection of the change.

2. The method of claim 1, wherein the at least one feedback signal comprises an indication of traffic priority and a radio frame configuration for respective cells of the cluster of cells.

3. The method of claim 2, wherein the at least one feedback signal comprises an indication of total guaranteed bit rate and non-guaranteed bit rate radio resource utilization at the cluster of cells for uplink and downlink traffic.

4. The method of claim 3, wherein the indication of traffic priority is used to prioritize the respective cells of the cluster of cells based on the total guaranteed bit rate and non-guaranteed bit rate radio resource utilization at the cluster of cells for the uplink and downlink traffic.

5. The method of claim 1, further comprising:
    receiving acceptance of the change at the cell from the first common radio frame configuration from the respective cells of the at least one other neighboring cell.

6. The method of claim 1, further comprising:
    receive signaling comprising a changed radio frame configuration with an aligned time division duplex configuration.

7. The method of claim 1, further comprising:
    sending signaling to the respective cells of the at least one other neighboring cell to implement a changed radio frame configuration.

8. An apparatus, comprising:
    at least one processor; and
    at least one non-transitory memory including computer program code, where the at least one memory and the computer program code are configured, with the at least one processor, to cause the apparatus to at least:
        transmit with an entity in a cell to at least one other neighboring cell of a cluster of cells of a communication network a request signal indicating a desire to change from a first common radio frame configuration with the at least one other neighboring cell to a second different common radio frame configuration, wherein the request signal comprises an indication of traffic measurements of the entity, wherein the indication of the traffic measurements of the entity comprises a radio link control buffer status or packet delay, and wherein the request signal is configured to invoke respective cells of the at least one other neighboring cell to send their indication of traffic measurements comprising a radio link control buffer status or packet delay of the respective cells; and
        in response to the request signal, receive at least one feedback signal from the at least one other neighboring cell to perform one of:
            implementing a change at the cell from the first common radio frame configuration to the second common radio frame configuration when the at least one feedback signal indicates acceptance of the change, or
            implementing a change at the cell from the first common radio frame configuration to a different individual local radio frame configuration when the at least one feedback signal indicates rejection of the change.

9. The apparatus of claim 8, wherein the at least one feedback signal comprises an indication of traffic priority and a radio frame configuration for respective cells of the cluster of cells.

10. The apparatus of claim 9, comprising the at least one memory including the computer program code is configured with the at least one processor to cause the apparatus to receive acceptance of the change at the cell from the first common radio frame configuration from the respective cells of the at least one other neighboring cell.

11. The apparatus of claim 9, comprising:
    the at least one memory including the computer program code is configured with the at least one processor to cause the apparatus to receive signaling comprising a changed radio frame configuration with an aligned time division duplex configuration.

12. The apparatus of claim 9, comprising:
the at least one memory including the computer program code is configured with the at least one processor to cause the apparatus to send signaling to the respective cells of the at least one other neighboring cell to implement a changed radio frame configuration.

13. The apparatus of claim 9, wherein the at least one feedback signal comprises an indication of total guaranteed bit rate and non-guaranteed bit rate radio resource utilization at the cluster of cells for uplink and downlink traffic.

14. The apparatus of claim 13, wherein the indication of traffic priority is used to prioritize the respective cells of the cluster of cells based on the total guaranteed bit rate and non-guaranteed bit rate radio resource utilization at the cluster of cells for the uplink and downlink traffic.

15. A method comprising:
receiving from an entity in a first cell with a neighboring second cell of a cluster of cells a request signal indicating a desire of the first cell to change from a first common radio frame configuration with the neighboring second cell to a second different common radio frame configuration, wherein the request signal comprises an indication of traffic priority for the entity in the first cell, wherein the indication of traffic priority is used to prioritize cells of the cluster of cells based on a total guaranteed bit rate and non-guaranteed bit rate radio resource utilization at the cluster of cells for uplink and downlink traffic; and
in response to the request signal, transmitting with the neighboring second cell to the first cell a feedback signal to perform one of:
acceptance, comprising signaling to the first cell to implement a change from the first common radio frame configuration to the second common radio frame configuration, or alternatively,
rejection, comprising signaling to the first cell to implement a change at the first cell from the first common radio frame configuration to a different individual local radio frame configuration.

16. A computer program product comprising a non-transitory computer-readable medium storing program code, the program code executed by at least one processor to perform the method according to claim 15.

17. The method of claim 15, wherein the request signal further comprises a radio frame configuration for the entity in the first cell.

18. An apparatus comprising:
at least one processor; and
at least one non-transitory memory including computer program code, where the at least one memory and the computer program code are configured, with the at least one processor, to cause the apparatus to at least:
receive from an entity in a first cell with a neighboring second cell of a cluster of cells a request signal indicating a desire of the first cell to change from a first common radio frame configuration with the neighboring second cell to a second different common radio frame configuration, wherein the request signal comprises an indication of traffic priority for the entity in the first cell, wherein the indication of traffic priority is used to prioritize cells of the cluster of cells based on a total guaranteed bit rate and non-guaranteed bit rate radio resource utilization at the cluster of cells for uplink and downlink traffic; and
in response to the request signal, transmit with the neighboring second cell to the first cell a feedback signal to perform one of:
acceptance, comprising signaling to the first cell to implement a change from the first common radio frame configuration to the second common radio frame configuration, or alternatively rejection, comprising signaling to the first cell to implement a change at the first cell from the first common radio frame configuration to a different individual local radio frame configuration.

19. The apparatus of claim 18, wherein the request signal further comprises a radio frame configuration for the entity in the first cell.

20. The apparatus of claim 19, wherein the at least one feedback signal comprises an indication of the total guaranteed bit rate and non-guaranteed bit rate radio resource utilization at the cluster of cells for uplink and downlink traffic.

* * * * *